US009900314B2

(12) United States Patent
Peckover

(10) Patent No.: US 9,900,314 B2
(45) Date of Patent: Feb. 20, 2018

(54) SYSTEM, METHOD AND APPARATUS FOR INCREASING WEBSITE RELEVANCE WHILE PROTECTING PRIVACY

(71) Applicant: DT Labs, LLC, Carrollton, TX (US)

(72) Inventor: Douglas Peckover, Carrollton, TX (US)

( * ) Notice: Subject to any disclaimer, the term of this patent is extended or adjusted under 35 U.S.C. 154(b) by 147 days.

(21) Appl. No.: 14/217,359

(22) Filed: Mar. 17, 2014

(65) Prior Publication Data

US 2014/0282917 A1    Sep. 18, 2014

Related U.S. Application Data

(60) Provisional application No. 61/793,804, filed on Mar. 15, 2013.

(51) Int. Cl.
*H04L 29/06*        (2006.01)

(52) U.S. Cl.
CPC .......... *H04L 63/10* (2013.01); *H04L 63/0807* (2013.01)

(58) Field of Classification Search
CPC ............ H04L 63/0407; H04L 63/0414; H04L 63/0421; H04L 63/10; H04L 63/0807
See application file for complete search history.

(56) References Cited

U.S. PATENT DOCUMENTS

| | | |
|---|---|---|
| 5,201,048 A | 4/1993 | Coulter et al. |
| 5,623,652 A | 4/1997 | Vora et al. |
| 5,778,361 A | 7/1998 | Nanjo et al. |
| 5,809,318 A | 9/1998 | Rivette et al. |
| 5,848,410 A | 12/1998 | Walls et al. |
| 5,907,838 A | 5/1999 | Miyasaka et al. |
| 5,978,779 A | 11/1999 | Stein et al. |
| 6,119,101 A | 9/2000 | Peckover |
| 6,286,002 B1 | 9/2001 | Axapoulos et al. |
| 6,298,369 B1 | 10/2001 | Nguyen |
| 6,466,918 B1 | 10/2002 | Spiegel et al. |
| 6,484,162 B1 | 11/2002 | Edlund |
| 6,489,968 B1 | 12/2002 | Ortega et al. |
| 6,574,624 B1 | 6/2003 | Johnson et al. |
| 6,678,680 B1 | 1/2004 | Woo |
| 6,766,315 B1 | 7/2004 | Bratsos et al. |
| 6,845,448 B1* | 1/2005 | Chaganti ................. H04L 29/06 707/999.009 |
| 6,983,273 B2 | 1/2006 | Banerjee et al. |
| 2001/0044837 A1 | 11/2001 | Talib et al. |
| 2002/0120506 A1 | 8/2002 | Hagen |

(Continued)

*Primary Examiner* — Jeffrey D Popham
(74) *Attorney, Agent, or Firm* — Daniel J. Chalker; Edwin S. Flores; Chalker Flores, LLP

(57) ABSTRACT

The present invention provides a system, method and apparatus for increasing relevance of a content provided to a visitor by a content provider by providing one or more server computers and at least one data storage communicably coupled to the one or more server computers, receiving at least a portion of a visitor token and at least a portion of a content provider token at the one or more server computers from a content provider device, determining whether a release of an anonymous unfilled demand for the visitor is authorized based on the visitor token, the content provider token and one or more preferences stored in the at least one data storage, and sending at least a portion of the anonymous unfilled demand for the visitor to the content provider device when the release is authorized.

26 Claims, 20 Drawing Sheets

(56) References Cited

U.S. PATENT DOCUMENTS

| | | | |
|---|---|---|---|
| 2002/0157026 A1* | 10/2002 | Brown | H04L 63/0421 726/3 |
| 2003/0204447 A1 | 10/2003 | Dalzell et al. | |
| 2003/0204449 A1 | 10/2003 | Kotas et al. | |
| 2004/0093327 A1 | 5/2004 | Anderson et al. | |
| 2004/0138996 A1 | 7/2004 | Bettenburg et al. | |
| 2004/0249682 A1 | 12/2004 | Demarcken et al. | |
| 2004/0249798 A1 | 12/2004 | Demarcken et al. | |
| 2004/0249799 A1 | 12/2004 | Demarcken et al. | |
| 2004/0267723 A1 | 12/2004 | Bharat | |
| 2005/0021506 A1 | 1/2005 | Sauermann et al. | |
| 2005/0071328 A1 | 3/2005 | Lawrence | |
| 2005/0076003 A1 | 4/2005 | Dubose et al. | |
| 2005/0080772 A1 | 4/2005 | Bem | |
| 2005/0119995 A1 | 6/2005 | Lee | |
| 2005/0125397 A1 | 6/2005 | Gross et al. | |
| 2005/0144162 A1 | 6/2005 | Liang | |
| 2005/0154723 A1 | 7/2005 | Liang | |
| 2005/0160107 A1 | 7/2005 | Liang | |
| 2005/0165744 A1 | 7/2005 | Taylor et al. | |
| 2005/0228780 A1 | 10/2005 | Diab et al. | |
| 2005/0240557 A1 | 10/2005 | Rorex et al. | |
| 2005/0251510 A1 | 11/2005 | Billingsley et al. | |
| 2005/0267870 A1 | 12/2005 | Everett-Church et al. | |
| 2005/0283468 A1 | 12/2005 | Kamvar et al. | |
| 2005/0283470 A1 | 12/2005 | Kuntzman et al. | |
| 2006/0111893 A1 | 5/2006 | Florian et al. | |
| 2006/0155581 A1 | 7/2006 | Eisenberger et al. | |
| 2006/0195414 A1 | 8/2006 | Arrouye et al. | |
| 2006/0195428 A1* | 8/2006 | Peckover | G06F 17/3064 |
| 2006/0195481 A1 | 8/2006 | Arrouye et al. | |
| 2007/0067275 A1 | 3/2007 | Shekel | |
| 2012/0324551 A1* | 12/2012 | Bretschneider | G06F 21/645 726/5 |

* cited by examiner

Enter your general interest in these products and services:

| | |
|---|---|
| Real Estate | (not interested) |
| Motor Vehicles | Cars |
| Employment | (not interested) |
| Financial services | Mortgages |
| Residential services | Plumbing |
| Professional services | Attorneys |
| Technology | (not interested) / Computers / Games / Networks / Supplies |
| Beautification | |
| Safety/preparedness | |

Figure 12

Enter your specific interest in computers:

| | |
|---|---|
| System type | Laptop |
| Processor | Intel Pentium-4 |
| Memory | 2GB |
| Hard drive size | 1TB |
| Screen type | UXGA |
| Screen size | 15" |
| Multimedia | (not interested) / Speakers / Game controller / Microphone / Graphics |
| Printer | |
| Price range | |

SYSTEM, METHOD AND APPARATUS FOR INCREASING WEBSITE RELEVANCE WHILE PROTECTING PRIVACY

PRIORITY CLAIM

The patent application claims priority to and is a non-provisional patent application of U.S. Patent Application No. 61/793,804 filed on Mar. 15, 2013.

This patent application is related to: (1) U.S. patent application Ser. No. 13/598,348 filed on Aug. 29, 2012, pending, entitled "System, Method and Apparatus for Electronically Searching for an Item"; and (2) U.S. patent application Ser. No. 13/752,024 filed on Jan. 28, 2013, pending, entitled "System, Method and Apparatus for Electronically Searching for an Item." Both of these applications are continuation applications of U.S. Pat. No. 8,364,670, entitled "System, Method and Apparatus for Electronically Searching for an Item", which is a non-provisional application of U.S. Patent Application No. 60/640,156 filed on Dec. 28, 2004. All of the foregoing applications are hereby incorporated by reference in their entirety.

FIELD OF THE INVENTION

The present invention relates generally to the field of computerized information retrieval and, more particularly, to a system, method and apparatus for electronically making Content on the Internet more Relevant.

BACKGROUND OF THE INVENTION

The World Wide Web has become a major force for both individuals and business. But there are problems for both Visitors (any person or businesses visiting a Website) and the businesses behind a Website (any business using the World Wide Web to offer products or services).

Visitors Need More Privacy

Websites treat all Visitors the same, or worse, they try to guess what Visitors want based on secretly collecting data using techniques like behavioral profiling. In spite of this, Visitors waste time trying to find what is needed because Websites often have low Relevance with their Content and/or Ads (Content/Ads). For example and referring to FIG. 1, a large Ad blocked the Content of a Website that the inventor of the present invention visited. The inventor has no interest in purchasing alcoholic beverages, so this wasted his time.

Websites usually have Privacy Policies stating that Privacy is very important, but the corresponding Terms of Service (or equivalent) undoes all of this with legalese stating that if any Visitor's personal information is lost or misused, the Website cannot be held responsible. The Visitor remains 100% liable for problems he or she did not create.

Visitors have no control over how their data is collected or used by a Website or how it is shared with other firms.

Visitors have no way to share how they have been treated by a Website, and no way to learn from other Visitors about how they have been treated by that Website.

Visitors have no warnings about a Website that does not respect Privacy.

Visitors have no way to have a private, controlled Dialogue with a Website to get additional information, make suggestions, discuss problems, etc.

Websites Need to be More Relevant

Websites are always looking for ways to increase revenue and margins, but the Web has turned many of their products and services into commodities. There are few ways for a Website to differentiate and protect margins either by the products and services being offered or by being Privacy Champions.

Relevance builds Visitor loyalty, but this is hard to achieve because of the ease of switching Websites to find a better price. This switching reduces Visitor loyalty and Website revenue. A Website needs to focus more on what is needed, rather than what it sells if it wants to increase Visitor Relevance, loyalty, and profitability.

A Website has no way to start a Visitor Dialogue, mend a damaged Visitor relationship, or reactivate a lapsed Visitor relationship unless that Visitor has Registered with that Website.

A Website has no way to share Visitor experiences with other Websites.

Serving Ads that are not Relevant wastes Visitor time and reduces Website Ad revenue. Referring again to FIG. 1, a large Ad blocked the Content of a Website that the inventor visited. The inventor has no interest in purchasing alcoholic beverages, so this eliminated the opportunity for the Website to generate revenue from this Ad.

Trying to increase Relevance by secretly collecting additional behavioral data may violate Visitor Privacy and make a Website less attractive to Visitors who value their Privacy. While this is a growing problem in the U.S., this is already a major problem in countries that follow the European Data Directive, and may become an even bigger problem with the proposed European Data Regulation.

PRIOR ART

Obtaining the proper balance of Privacy and Relevance is one of the major problems in businesses today. Customer Relationship Management (CRM) systems work on the know-thy-customer principle, believing that the more a business knows about a person, the better that business can serve that person. Prior art with CRM, behavioral profiling, tracking, cookies, adware, keyboard sniffing, Web bugs, spyware, etc. have all created a hostile environment summarized by industry analysts, as in the Gartner® *Top End User Predictions for* 2010: *Coping with the New Balance of Power*. It concludes:

The potential backlash from consumers on Internet marketing cannot be underestimated. Eventually marketers WILL abuse the Internet channel and annoy customers enough to generate an outcry strong enough to push legislation regulating Internet marketing activity. Consequences will include:

That companies focusing primarily on the Internet for marketing purposes could find themselves unable to market effectively to customers, putting themselves at a competitive disadvantage.

Vendors that focus solely or predominately on producing Internet marketing could find themselves faced with a declining market, as companies shift marketing funds to other channels to compensate.

Since the mid-90's Privacy Policies have attempted to solve these problems, but these have not been successful. Privacy Policies tell Visitors what rights they have, but their corresponding Terms of Service ensure that these rights seldom stand up in court. For example, the Google® Terms of Service disclaimer has wording that removes Visitor rights, and the exact wording can be found on tens of millions of other Websites! Visitors have no Website Privacy rights.

On Dec. 1, 2010, The Federal Trade Commission released its "do not track" guidelines for the Internet. FTC Chairman Jon Leibowitz said "the report shows a failure of private industry to adequately address customer privacy concerns online. Despite some good actors, self-regulation of privacy has not worked adequately and is not working adequately for American consumers. We deserve far better from the companies we entrust our data to, and industry as a whole needs to do a far better job." More than two years later, "do not track" practices have still not been implemented and the Digital Advertising Alliance®, which claims to represent more than 5,000 companies, has told its members to "simply ignore" any "do not track" request.

Privacy outside U.S. is far more important because people in many countries are already protected by laws such as the European Data Directive, and the proposed European Data Regulation may give citizens even more rights, including the "right to be forgotten." This puts U.S. companies doing business outside the U.S. at a disadvantage because few have the required Privacy expertise. In fact, some compliance requirements have even been called "technically impossible." And even if compliance was easy, U.S. companies certainly do not want to risk taking better care of overseas Visitors than they do with their own U.S. Visitors.

One reason why Websites cannot protect Visitors is that personal information must travel from Visitors' devices, through the Web, to the Websites. Personal information is managed by millions of hardware components and millions of lines of code written by thousands of people from dozens of companies. No Website wants to assume the liability for all of this.

Lessons from Google®

In 2007, Google's CEO Eric Schmidt was asked to define Web 3.0. He defined it as a different way of building applications:

By piecing them together,
Where data is in the cloud,
That run on any device,
That are very Customizable.

This common practice has resulted in the steady decline of Privacy. Not surprisingly, Google® is now being sued more often by groups and governments that do not want increased Relevance at the expense of reduced Privacy. A better answer would have been a different way of building applications:

That focus on what a person wants,
Where data is protected in the cloud,
That run privately on any device,
That are Customized to what a person wants, not what is being sold.

What is needed is a way to increase Visitor Privacy, while at the same time, increase Website Relevance.

SUMMARY OF THE INVENTION

The present invention increases Visitor Privacy and Website Relevance by turning conventional wisdom upside down with this: the less a business knows about a person, the better that business can serve that person. It is based on the fact that what a person wants has nothing to do with who that person is. Identity is only needed by a Website at the end of a transaction—for payment, delivery, and support. Until then, Visitors use the present invention to disclose their "Anonymous Unfulfilled Demand" (AUD) in a trusted, anonymous environment so that a Website can Customize Content/Ads to make it more Relevant for the benefit of all parties. This trust is further enhanced with a private, controlled Messaging system between Visitors and Websites.

The present invention provides a computerized method for increasing relevance of a content provided to a visitor by a content provider by providing one or more server computers and at least one data storage communicably coupled to the one or more server computers, receiving at least a portion of a visitor token and at least a portion of a content provider token at the one or more server computers from a content provider device, determining whether a release of an anonymous unfilled demand for the visitor is authorized based on the visitor token, the content provider token and one or more preferences stored in the at least one data storage, and sending at least a portion of the anonymous unfilled demand for the visitor to the content provider device when the release is authorized.

In addition, the present invention provides an apparatus for increasing relevance of a content provided to a visitor by a content provider that includes one or more server computers, and at least one data storage communicably coupled to the one or more server computers. The one or more server computers (a) receive at least a portion of a visitor token and at least a portion of a content provider token at the one or more server computers from a content provider device, (b) determine whether a release of an anonymous unfilled demand for the visitor is authorized based on the visitor token, the content provider token and one or more preferences stored in the at least one data storage, and (c) send at least a portion of the anonymous unfilled demand for the visitor to the content provider device when the release is authorized.

The present invention also provides a system for increasing relevance of a content provided to a visitor by a content provider that includes a network, one or more visitor devices communicably coupled to the network, one or more content provider devices communicably coupled to the network, one or more server computers communicably coupled to the network and at least one data storage communicably coupled to the one or more server computers. The one or more server computers (a) receive at least a portion of a visitor token and at least a portion of a content provider token at the one or more server computers from a content provider device, (b) determine whether a release of an anonymous unfilled demand for the visitor is authorized based on the visitor token, the content provider token and one or more preferences stored in the at least one data storage, and (c) send at least a portion of the anonymous unfilled demand for the visitor to the content provider device when the release is authorized.

Moreover, the present invention provides a non-transitory computer readable medium for increasing relevance of a content provided to a visitor by a content provider comprising program instructions when executed by a processor causes the processor to perform the steps of receiving at least a portion of a visitor token and at least a portion of a content provider token at the processor from a content provider device; determining whether a release of an anonymous unfilled demand for the visitor is authorized based on the visitor token, the content provider token and one or more preferences stored in at least one data storage communicably coupled to the processor; and sending at least a portion of the anonymous unfilled demand for the visitor to the content provider device when the release is authorized.

BRIEF DESCRIPTION OF THE DRAWINGS

The above and further advantages of the invention may be better understood by referring to the following description in conjunction with the accompanying drawings, in which:

FIG. 12 is a screenshot of Requested Categories of interest in accordance with one embodiment of the present invention;

FIG. 13 is a screenshot of Requested Category Attributes of interest in accordance with one embodiment of the present invention;

Figure 14:
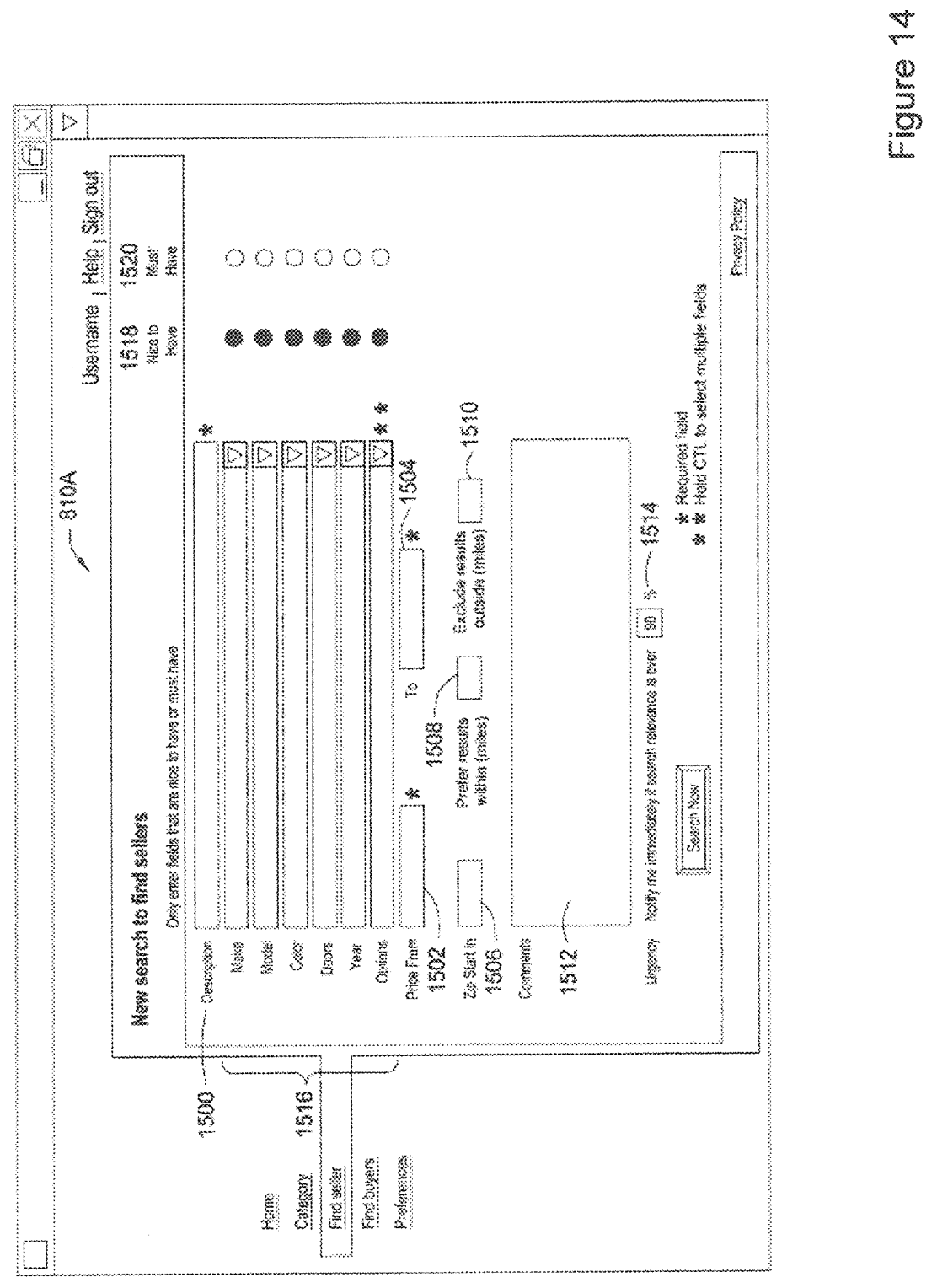

FIG. 14 is a screenshot of Requested Category Attributes of interest from another system in accordance with one embodiment of the present invention;

DETAILED DESCRIPTION OF THE INVENTION

Figure 1:
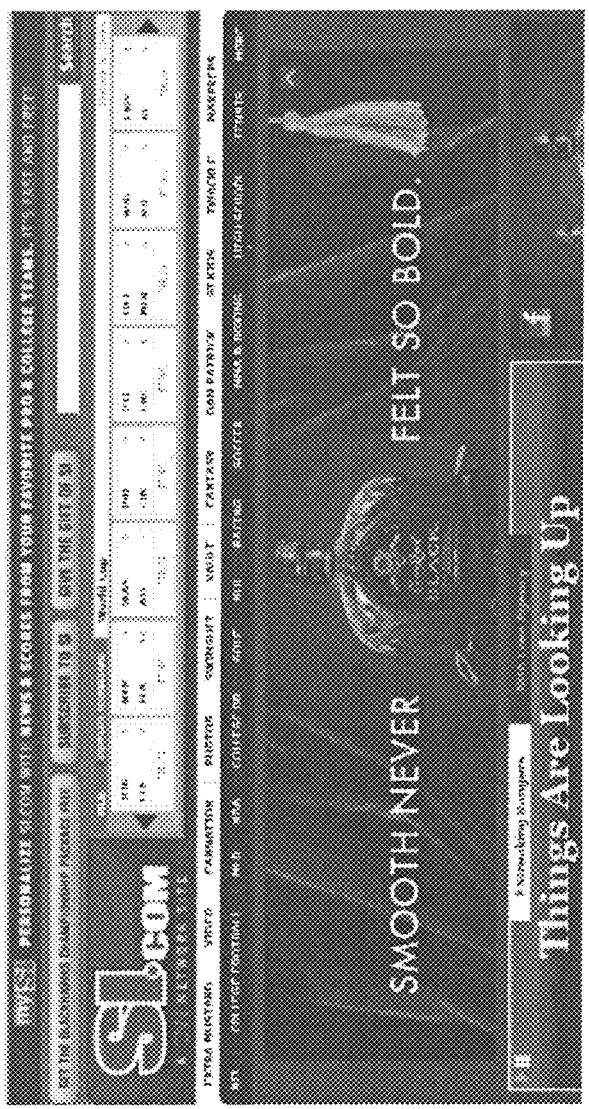
FIG. 1 is a screenshot of a typical Website showing irrelevant Content (a popup Ad) in accordance with the prior art.

There is only one way for any business to generate revenue:

[the number of items sold] times [the margin of that item] Consider these two examples:

Business A sells one item ten times to ten consumers.

Business B sells the same ten items to one consumer.

Business A always makes the same amount of money as Business B. Some businesses prefer the former so that they have ten ways to increase revenue. Other businesses prefer the latter because they know that 20% of their consumers generate 80% of their revenue, and they want people with the highest "lifetime value."

What's missing from these examples? The answer is who bought the items. It does not matter who bought the items— identity and personal information did not matter because both businesses make exactly the same revenue.

The main reason why businesses collect personal information is so they can control Visitor relationships. Businesses are concerned about letting go of know-thy-customer because they fear that customers may not come back. But the Web has changed the rules of businesses forever. Customers may in fact come back several times a day if they want to. Customers have so much power that the conventional metrics of loyalty and lifetime value have changed forever. These have given way to new metrics like "trust" and "control." As Gartner® predicted in 2005, data "only produces revenue when consumers allow it. In the new economics, the consumer controls the value."

The present invention gives consumers that trust and control for the benefit of all parties. Visitors Register and enter their "Anonymous Unfulfilled Demand" (AUD) for the products, services, relationships, etc. that they want. This is in the form of Requested Categories of interest and Requested Category Attributes of interest, and is used by a Website to make Content/Ads more Relevant.

In one embodiment, the present invention protects Visitors:

A Visitor enters a Minimum Privacy Score which is compared to a Website's Privacy Score before AUD is disclosed. A Visitor may override this Website's Privacy Score by adding the Website to a White List or Black List.

A Visitor enters a Minimum Website Rating which is compared to a Website's Rating before AUD is disclosed. A Visitor may override this Website Rating by adding the Website to a White List or Black List.

Visitors enter Website Ratings about individual Websites to tell other Visitors about their experience with this Website. This includes both positive and negative treatment, such as broken promises, poor customer service, great customer service, etc.

In another embodiment, the present invention protects Websites:

A Website enters a Minimum Visitor Rating which is compared to a Visitor's Rating before AUD is accepted. A Website may override this Visitor Rating by adding the Visitor to a White List or Black List.

Websites enter Visitor Ratings about individual Visitors to tell other Websites about their experience with this Visitor. This includes both positive and negative treatment, such as excessive returned merchandise, click fraud abuse, etc.

In one embodiment, the AUD is stored on a Secure Server without any associated personal information about the Visitor to whom it belongs. While this data is secured using standard security methods, the theft or misuse of this AUD cannot identify or hurt the Visitor because his or her identity is unknown.

The AUD is now ready to be shared with a Website to increase Visitor Privacy and Website Relevance. The following describes the present invention in more detail.

Visitor Registration

Figure 2:
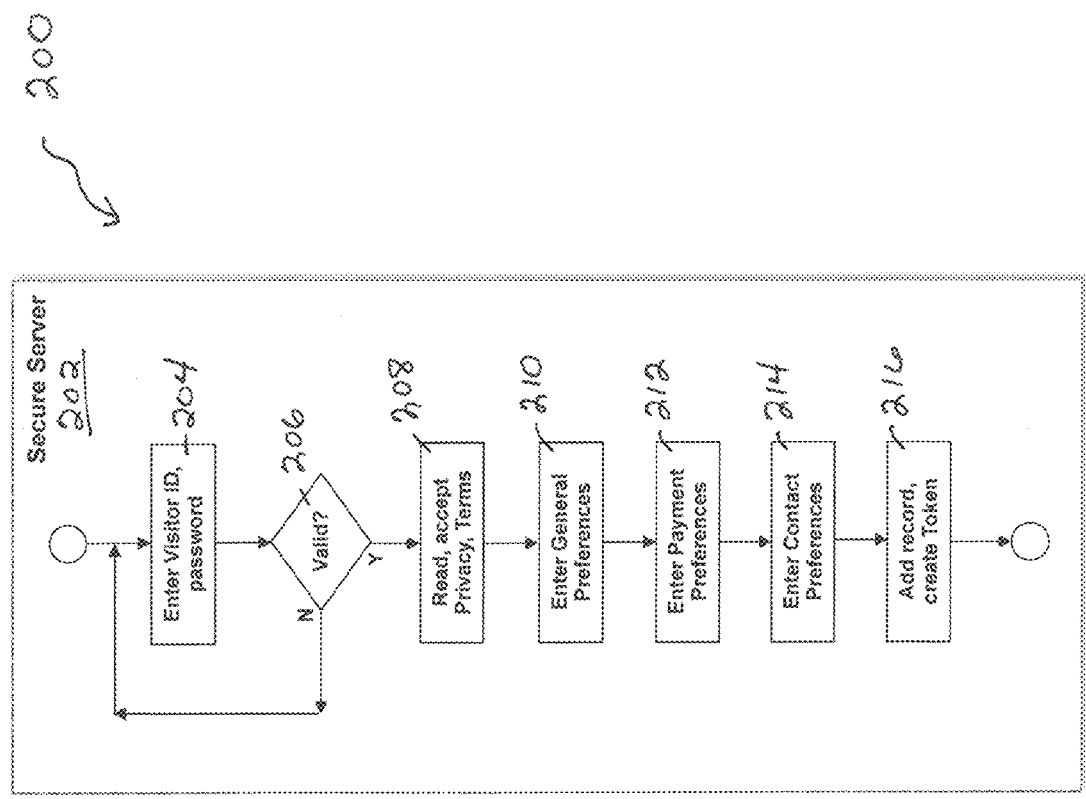
FIG. 2 is a flowchart that illustrates a Visitor Registration in accordance with one embodiment of the present invention.

In one embodiment and referring to the flowchart 200 of FIG. 2, a Visitor uses a Browser to Register on the Secure Server 202 so that he or she can enter their AUD. A Visitor:

- Enters a unique Visitor ID and password in block 204. These are validated as shown in decision block 206. If the validation is not successful, the Visitor is notified and may attempt to reenter his/her unique Visitor ID and password in block 204. The number of unsuccessful attempts can be limited.
- Reads and accepts the Privacy Policy/Terms of Service that explains how their AUD may be collected and used in block 208.
- Enters General Preferences in block 210, including:
  - Language, location, and Ad Preferences.
  - Requested Categories of interest, such as computers as shown in FIG. 12.
  - Requested Category Attributes of interest, such as the type, processor, memory, hard disk size, and screen type as shown in FIG. 13.
  - Website-to-Visitor Counter for the maximum number of consecutive unanswered Messages permitted from a Website, typically set to one for maximum control. A value of zero means that that no Messages are permitted.
  - Minimum Privacy Score required for AUD to be disclosed to a Website.
  - Minimum Website Rating required for AUD to be disclosed to a Website.
- Optionally, enters Payment Preferences in block 212 for a Website paying this Visitor for the use of their AUD, for time spent on the Website, for clicking on an Ad, etc. If Payment Preferences are not entered, they are set to default values and the amount totals are accrued for later instructions from the Visitor.
- Optionally, enters Contact Preferences in block 214 for how the Secure Server Contacts the Visitor, such as an instant message, email, text message, Facebook®, or Twitter® address. This is used to automatically notify the Visitor about an event, such as a Message received from the Secure Server. If Contact information is not entered, the Visitor accesses the Secure Server to get Messages.

The Secure Server 202 adds a Visitor record in its central database in block 216. Note that no personal information is requested or required.

The Secure Server 202 also creates a globally unique Token in block 216 that is placed on the Visitor's device, such as a cookie on a personal computer, to be later used by a Website or the Secure Server 202. This Token does not contain any personal information.

While the present invention refers to passing Tokens between various parties, it will be understood that cookies are not passed but are instead read by the receiving party.

Website Registration

Figure 3:
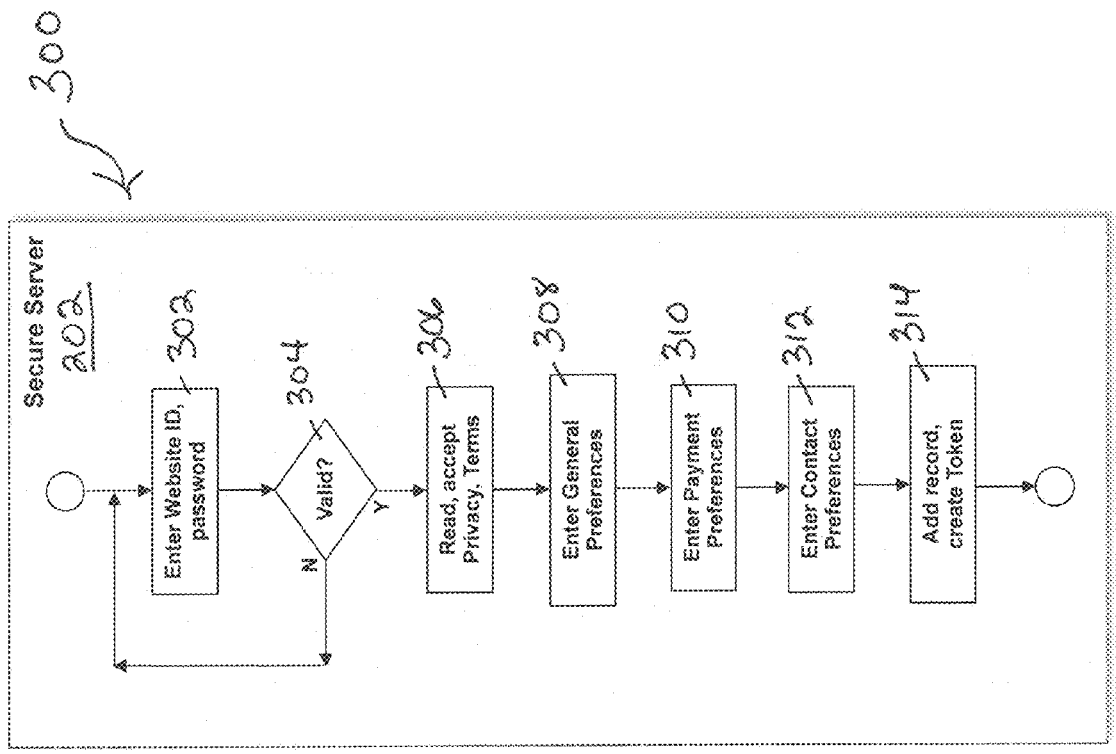
FIG. 3 is a flowchart that illustrates a Website Registration in accordance with one embodiment of the present invention.

In one embodiment and referring to the flowchart 300 of FIG. 3, a Website Administrator or Representative uses a Browser to Register on the Secure Server 202 so that the Website can access Visitor AUD. A Website Administrator or Representative:

- Enters a unique Website ID and password in block 302. These are validated as shown in decision block 304. If the validation is not successful, the Visitor is notified and may attempt to reenter his/her unique Visitor ID and password in block 302. The number of unsuccessful attempts can be limited.
- Reads and accepts the Privacy Policy/Terms of Service that explains how the AUD may be accessed and used in block 306.
- Enters General Preferences in block 308, including:
  - The attributes of the Website's own Privacy Policy/Terms of Service, including the use of tracking, spyware, data sharing, and its methods to resolve conflicts.
  - Language.
  - Location.
  - Categories served by this Website, such as computers.
  - Visitor-to-Website Counter for the maximum number of consecutive unanswered Messages permitted from a Visitor. A value of zero means that that no Messages are permitted and a value of 99 means that unlimited Messages are permitted.
  - Minimum Visitor Rating which is compared to a Visitor's Rating before AUD is accessed by a Website.
- Enters Payment Preferences in block 310 for accessing and using a service.
- Optionally, enters Contact Preferences in block 312 for how the Secure Server 202 Contacts the Website, such as an instant message, email, text message, or XML address. This is used to automatically notify the Website about an event, such as a Message received from the Secure Server 202. If Contact information is not entered, then the Website Administrator or Representative must return to the Secure Server 202 to get Messages.

The Secure Server 202 adds a Website record in its central database in block 314. Note that no personal information is requested or necessarily required.

The Secure Server 202 also creates a globally unique Token for the Website in block 314, such as a digital certificate. In one embodiment, this is later used by the Website to be authorized by the Secure Server 202.

The Visitor and Website are now ready to improve Visitor Privacy and Website Relevance.

Enabling Visitor Privacy and Website Relevance

Figure 4:
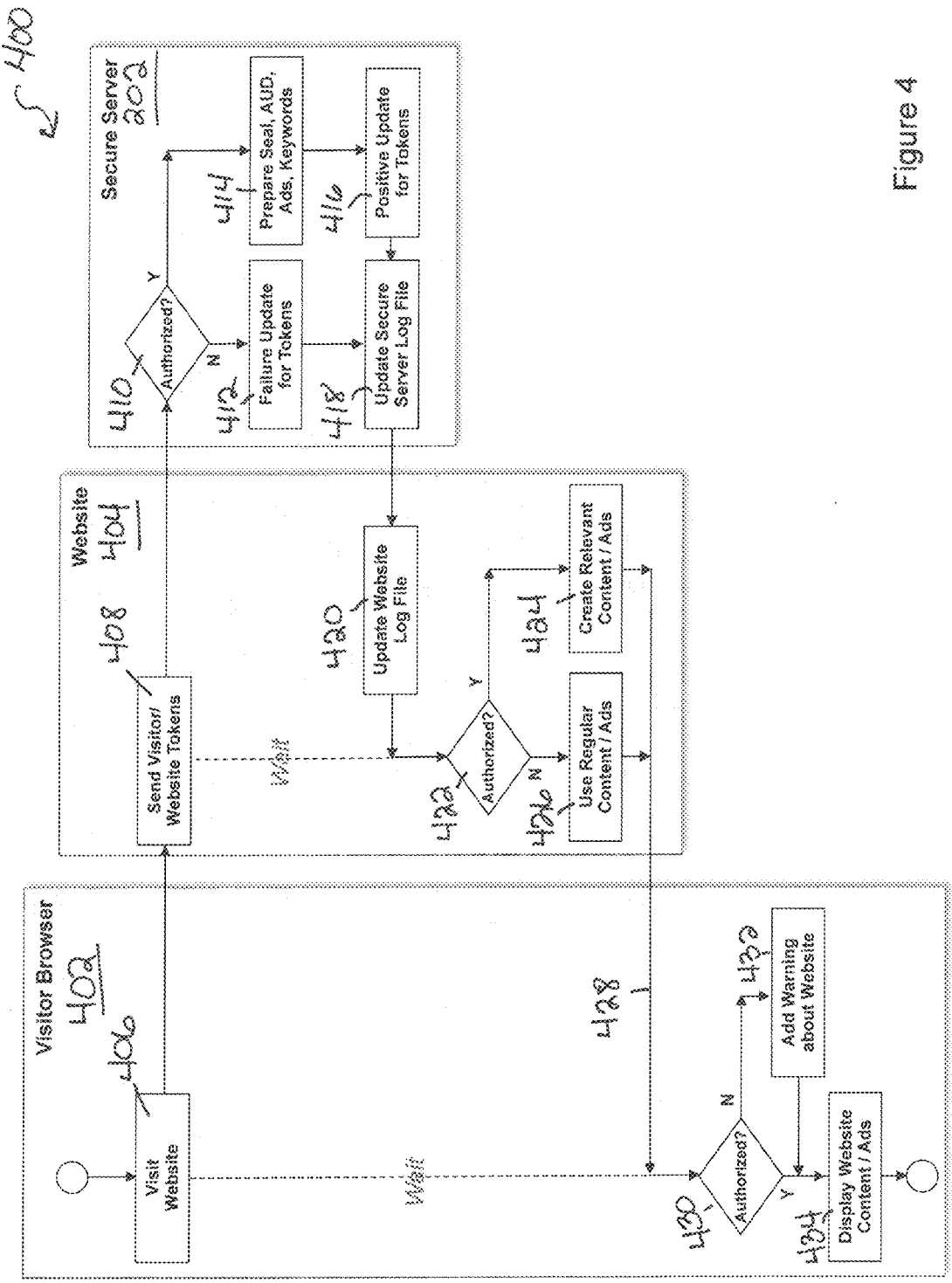
FIG. 4 is a flowchart that illustrates enabling Visitor Privacy and Website Relevance in accordance with one embodiment of the present invention.

In one embodiment and referring to the flowchart 400 in FIG. 4, a Registered Visitor uses a Browser 402 to visit a Registered Website 404 in block 406:

- The Website 404 reads the Visitor's Token, such as a cookie, and recognizes that this Visitor is using the present invention to protect his or her Privacy and increase Relevance on this Website 404.
- Information from the Visitor Token and the Website Token is sent to the Secure Server 202 in block 408:
  - If the Visitor or Website 404 are not Authorized to use the present invention, or if the Website 404 is not Authorized to use this Visitor's AUD, etc., as determined in decision block 410, Authorization Fails and the Visitor and Website Tokens are updated with a reason code in block 412. Reasons for this Failure include:
    - The Website's Privacy Score is below the Minimum Privacy Score required by this Visitor. This protects Visitors.
    - The Website's Rating is below the Minimum Website Rating required by this Visitor. This protects Visitors.
    - The Website has been Black Listed by the Visitor. This protects Visitors.

The Visitor's Rating is below the Minimum Visitor Rating required by this Website. This protects Websites.

The Visitor has been Black Listed by the Website. This protects Websites.

If the AUD is Authorized, as determined in decision block 410, in one embodiment, the Secure Server 202 Prepares a Customized Seal, Visitor AUD, Secure Server Ads, and/or Keywords for third party Ads in block 414, and updates these in the Visitor and Website Tokens in block 416.

In all cases, the Secure Server Log File is updated in block 418.

The Website Log File is updated in block 420, including the Visitor Token for possibly establishing or continuing a Dialogue with the Visitor.

If Authorized by the Secure Server 202, as determined in decision block 422, the Website 404 uses the Seal, AUD, Ads, and/or Keywords to create Relevant Content/Ads to increase the Website's Relevance for this Visitor while still respecting his or her Privacy in block 424. Otherwise, the Website 404 uses its Regular Content/Ads in block 426.

The Content/Ads are passed to the Visitor's Browser 402 (arrow 428).

In one embodiment, if the Browser 402 uses a plug-in to see the change in the Visitor's Token, or if there is no change because the present invention is not being used, as determined in decision block 430, a Warning is added to the Content to inform the Visitor that the Website 404 was not Authorized in block 432. Note that the Visitor can override this in Visitor Maintenance by lowering his or her Minimum Privacy Score for all Websites, by lowering his or her Minimum Website Rating for all Websites, and/or by adding this Website 404 to a White List.

The Website's Content/Ads are displayed by the Visitor's Browser in block 434.

Secure Server making Website Content/Ads Relevant

Figure 5:
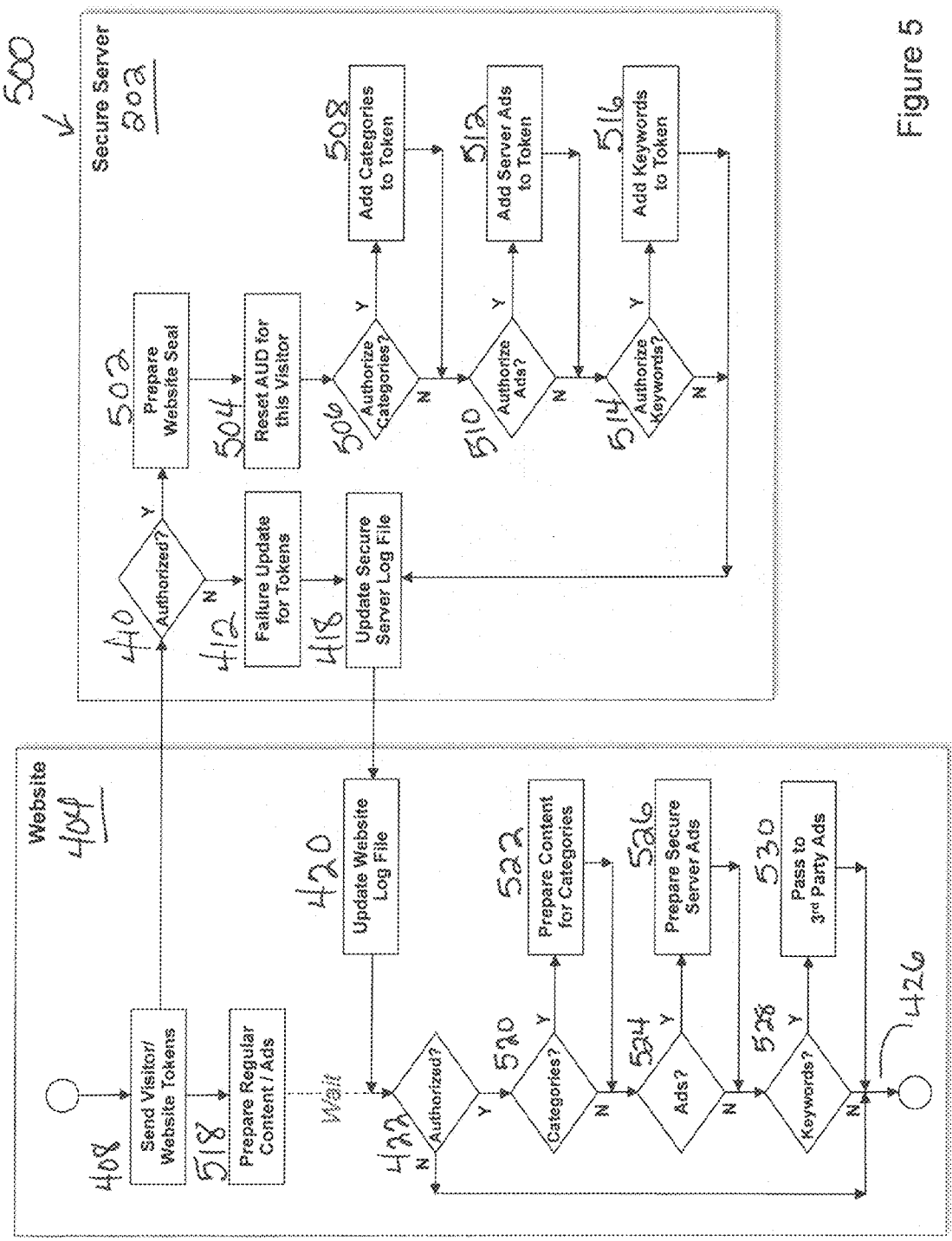
FIG. 5 is a flowchart that illustrates a Secure Server increasing Website Relevance in accordance with one embodiment of the present invention.
Figure 6:
FIG. 6 is a Customized Seal in accordance with one embodiment of the present invention.
Figure 7:
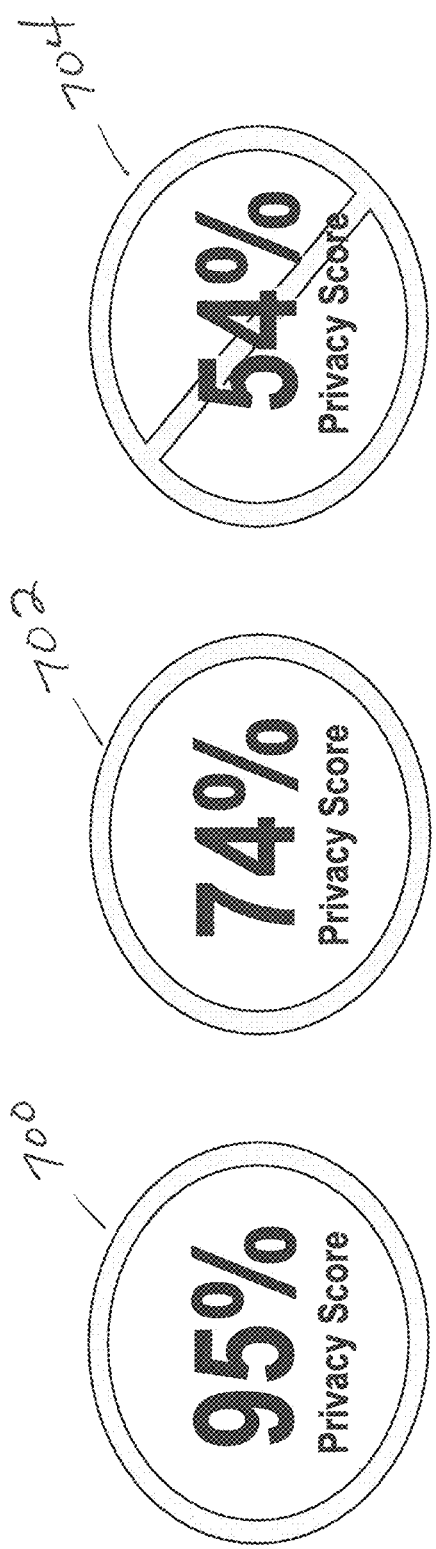
FIG. 7 is three Customized Seals in accordance with one embodiment of the present invention.
Figure 8:
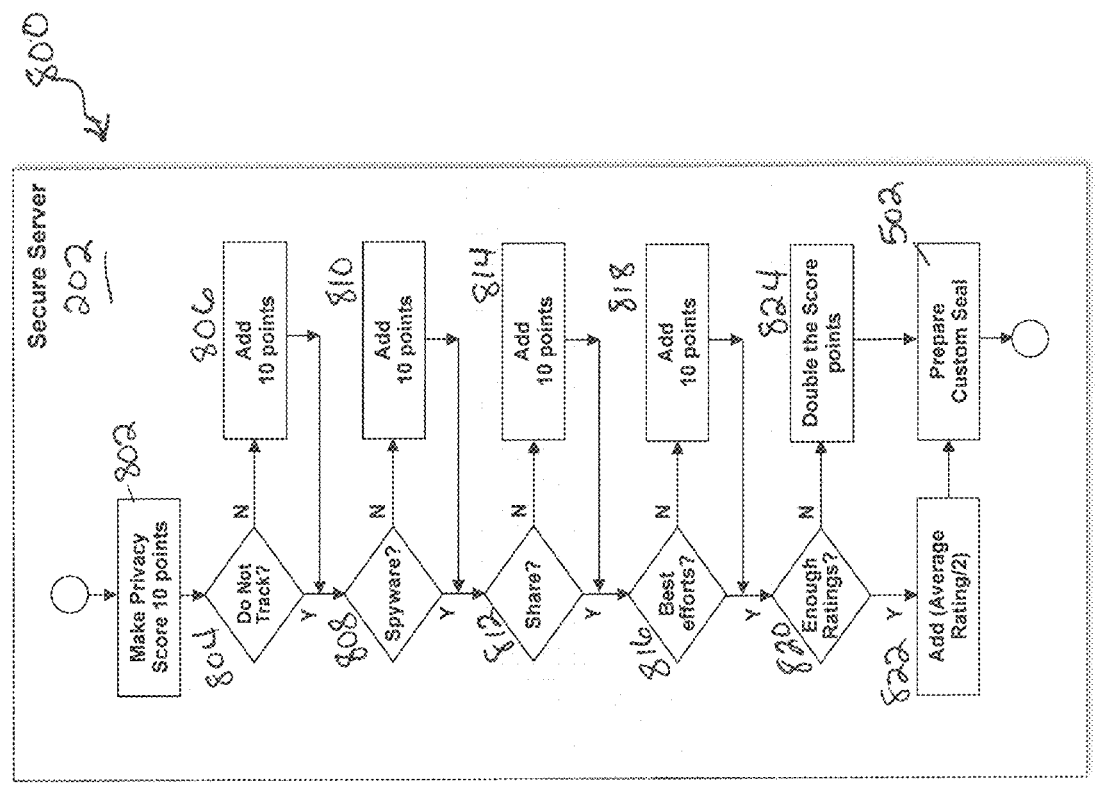
FIG. 8 is a flowchart that illustrates how a Secure Server calculates a Website's Privacy Score in accordance with one embodiment of the present invention.

The preceding is described in more detail. In one embodiment and referring now to the flowchart 500 in FIG. 5, the Website 404 sends the Visitor and Website Tokens to the Secure Server 202 in block 408. The Secure Server 202 performs the following:

If the Website 404 is not Authorized by the Secure Server 202, as determined in decision block 410, a Failure Seal (e.g., Seal 600 in FIG. 6, etc.) is created and a Failure Update is stored in the Visitor and Website Tokens in block 412. Other types and designs of Failure Seals or indicia can be used. Otherwise:

A Customized Seal (e.g., Seals 700, 702, 704 in FIG. 7, etc.) is prepared in block 502 based on the attributes of the Website's Privacy Policy/Terms of Service and the Website's Rating, as discussed in FIG. 8. Other types and designs of Customized Seals or indicia can be used.

The AUD is reset in block 504 to ensure that the needs of the Visitor are always current and up-to-the-moment.

Website Authorization may be given for several reasons, including Visitor Preferences or Websites paying for a service:

If the Website 404 is Authorized to receive this Visitor's AUD of Requested Categories of interest and Requested Category Attributes of interest, as determined in decision block 506, these are added to the Tokens in block 508.

If the Website 404 is Authorized to receive the Secure Server Ads based on the Visitor's Ad Preferences, as determined in decision block 510, they are added to the Tokens in block 512.

If the Website 404 is Authorized to receive Keywords based on the Visitor's Ad Preferences, as determined in decision block 514, they are added to the Tokens in block 516.

In all cases, the Visitor and Website transaction is updated on the Secure Server Log File in block 418.

During this time, the Website 404 prepares its Regular Content/Ads in block 518.

With the return of the Tokens from the Secure Server 202, the Website 404 performs the following:

The Website Log File is updated in block 420.

If not Authorized, as determined in decision block 422, the Website 404 uses its Regular Content (see block 426 in FIG. 4). Otherwise, the Seal can be prepared by the Website 404 for displaying and then:

If the Visitor's Token contains Requested Categories of interest and Requested Category Attributes of interest, as determined in decision block 520, the Website 404 mass-customizes its Content for this Visitor to make it more Relevant in block 522.

If the Visitor's Token contains Secure Server Ads, as determined in decision block 524, the Website 404 prepares them for this Visitor to make them more Relevant in block 526.

If the Visitor's Token contains Keywords, as determined in decision block 528, the Website 404 passes them to third parties such as Google® AdWords® to make these ads more Relevant in block 530.

The Regular Content or Relevant Content/Ads with Seal are displayed on the Visitor Browser (see arrow 428 in FIG. 4).

Whenever possible, the present invention has made its Content/Ads Relevant to the Visitor while at the same time protecting that Visitor's Privacy.

Custom Seal Processing

In one embodiment and referring now to the flowchart 800 in FIG. 8, the Secure Server 202 creates a Customized Seal (e.g., Seals 700, 702, 704 in FIG. 7, etc.) for a Website 404:

Website's Privacy Score starts with 10 points for using the present invention and attempting to be a Privacy Champion in block 802.

From the Website's General Preferences:

If the Website supports "do not track" by agreeing to not store behavioral profiles without specific Visitor permission, as determined in decision block 804, add 10 points to the Privacy Score (opt-in) in block 806.

If the Website agrees not to use spyware, cookies, Web beacons, Web bugs, adware, spyware, spam, etc. without specific Visitor permission, as determined in decision block 808, add 10 points to the Privacy Score (opt-in) in block 810.

If the Website agrees not to share, trade, or sell personal information without specific Visitor permission, as determined in decision block 812, add 10 points to the Privacy Score (opt-in) in block 814.

If the Website agrees to use its best efforts to resolve disputed issues with its Visitors, as determined in decision block 816, add 10 points to the Privacy Score in block 818.

If there are enough Website Ratings entered by Visitors about this Website, as determined in decision block 820, divide the Average Website Rating by 2 and add it to calculate the final Website's Privacy Score in block 822. Otherwise, double the Website's Privacy Score in block 824.

Secure Server 202 uses the Website's Privacy Score to prepare a Custom Seal (e.g., Seals 700, 702, 704 in FIG. 7, etc.) for this Website 404 in block 502. For example, this Seal may include different colors and/or an additional diagonal line to accent acceptable and unacceptable Website Privacy Scores. Other designs, colors or indicia can be used.

When a Visitor clicks on a Seal image, the Secure Server 202 displays a separate screen showing details about how the Website Privacy Score was calculated so that Visitors can make informed decisions about whether or not to trust this Website 404 or Search Engine result (see e.g., FIGS. 16-20).

Message "Baton" Processing

In one embodiment of the present invention, the decision to receive a Message is controlled not by the sending party but by the receiving party. A Message is like a "baton" that is passed from the sender to the receiver. The receiver continues the Dialogue by returning that baton, and ends the Dialogue by doing nothing with it. The baton goes back and forth until one party does not return it. This protects both Visitors and Websites.

Website Establishing a Dialogue with a Visitor

In one embodiment, the Website wants to send a Message to a Visitor. Reasons for this may include:

Establishing a relationship after a Visitor visits the Website.

Announcing an upcoming promotion, possibly tailored for this Visitor's Requested Categories of interest and Requested Category Attributes of interest.

Correcting an Authorization Failure because of a low Website Privacy Score or a low Website Rating. Entries in the Website's Log File show which Visitors had a Failed Authorization. The Website may use the present invention's Messaging to resolve problems and encourage Visitors to add the Website to his or her White List and to give a positive recommendation in the Website's Rating so that Authorization is granted next time and the Website's Privacy Score may be improved.

Figure 9:
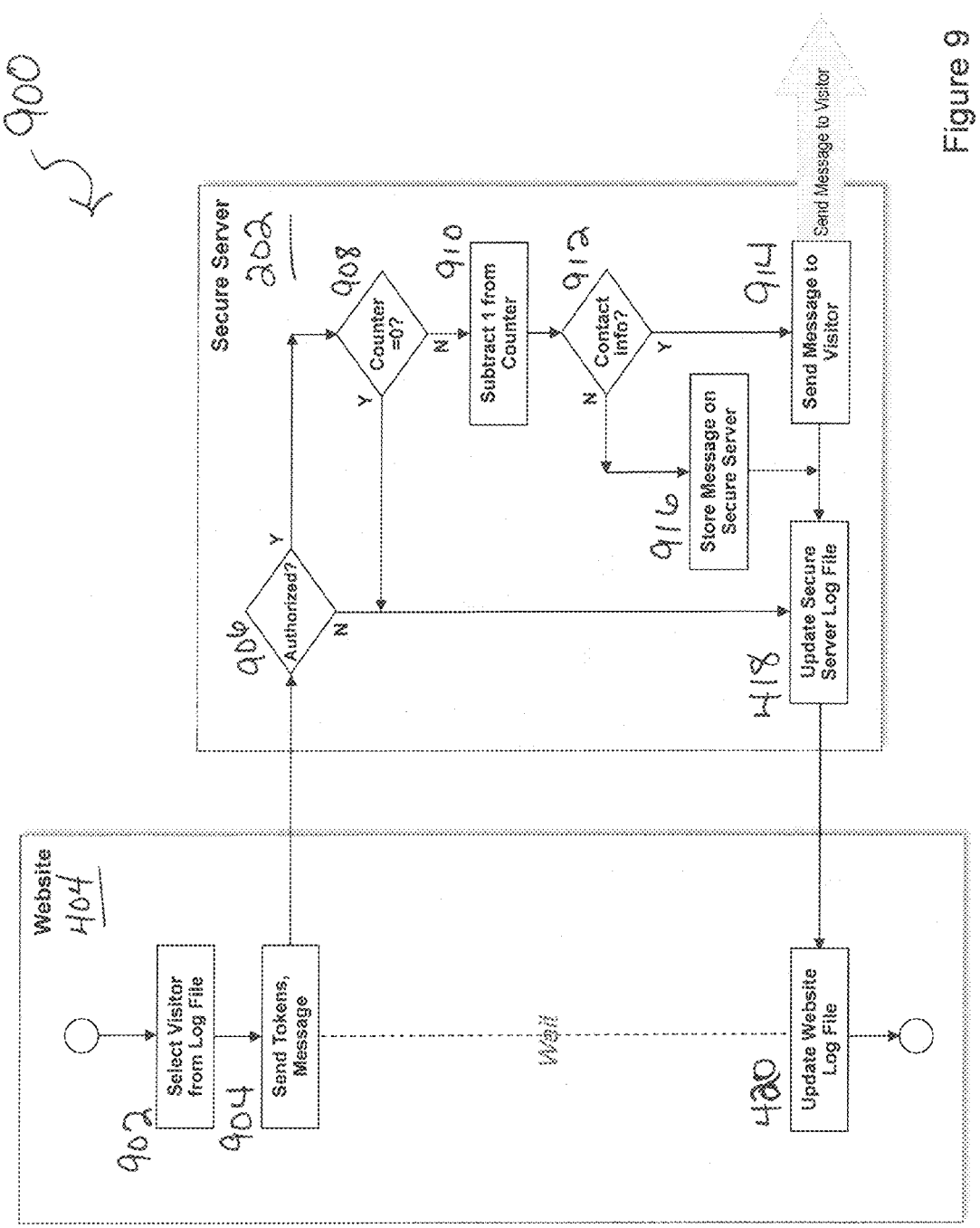
FIG. 9 is a flowchart that illustrates a Website establishing a Dialogue with a Visitor in accordance with one embodiment of the present invention.

Referring now to the flowchart 900 in FIG. 9, the Website 404 Contacts the Visitor through the Secure Server 202:

The Website 404 either manually or automatically selects a specific Visitor from the Website Log File in block 902. The Website Log File is shown being updated in block 420 in FIG. 4.

The Website 404 sends that Visitor's Token, its own Website Token, and the requested Message to the Secure Server 202 in block 904. The Secure Server 202 performs the following:

If the Website 404 or Visitor are not Authorized to use the present invention, as determined in decision block 906, the Authorization Fails.

If the Website 404 is not Authorized to use this Visitor's Token, such as being Black Listed by the Visitor, as determined in decision block 906, the Authorization Fails.

If the Website-to-Visitor Counter for this Visitor/Website combination is zero, as determined in decision block 908, the Authorization Fails. Otherwise:

The Website-to-Visitor Counter for this Visitor/Website combination is decreased by one in block 910.

If the Secure Server 202 has Contact information for this Visitor, as determined in decision block 912, the Message is sent to Visitor in the preferred manner in block 914, such as by an instant message, email, text message, Facebook®, or Twitter®. Note that the Visitor's Contact information is not given to the Website 404.

Otherwise the Message is stored on the Secure Sever 202 in block 916 to be later accessed by the Visitor's Browser.

The Secure Server Log File is updated in block 418.

The Website Log File is updated in block 420.

If the Visitor later replies to the Message, the Visitor's Website-to-Visitor Counter for this Website 404 is reset to the number of consecutive unanswered Messages permitted by this Website 404 to this Visitor.

Visitor Establishing a Dialogue with a Website

Figure 10:
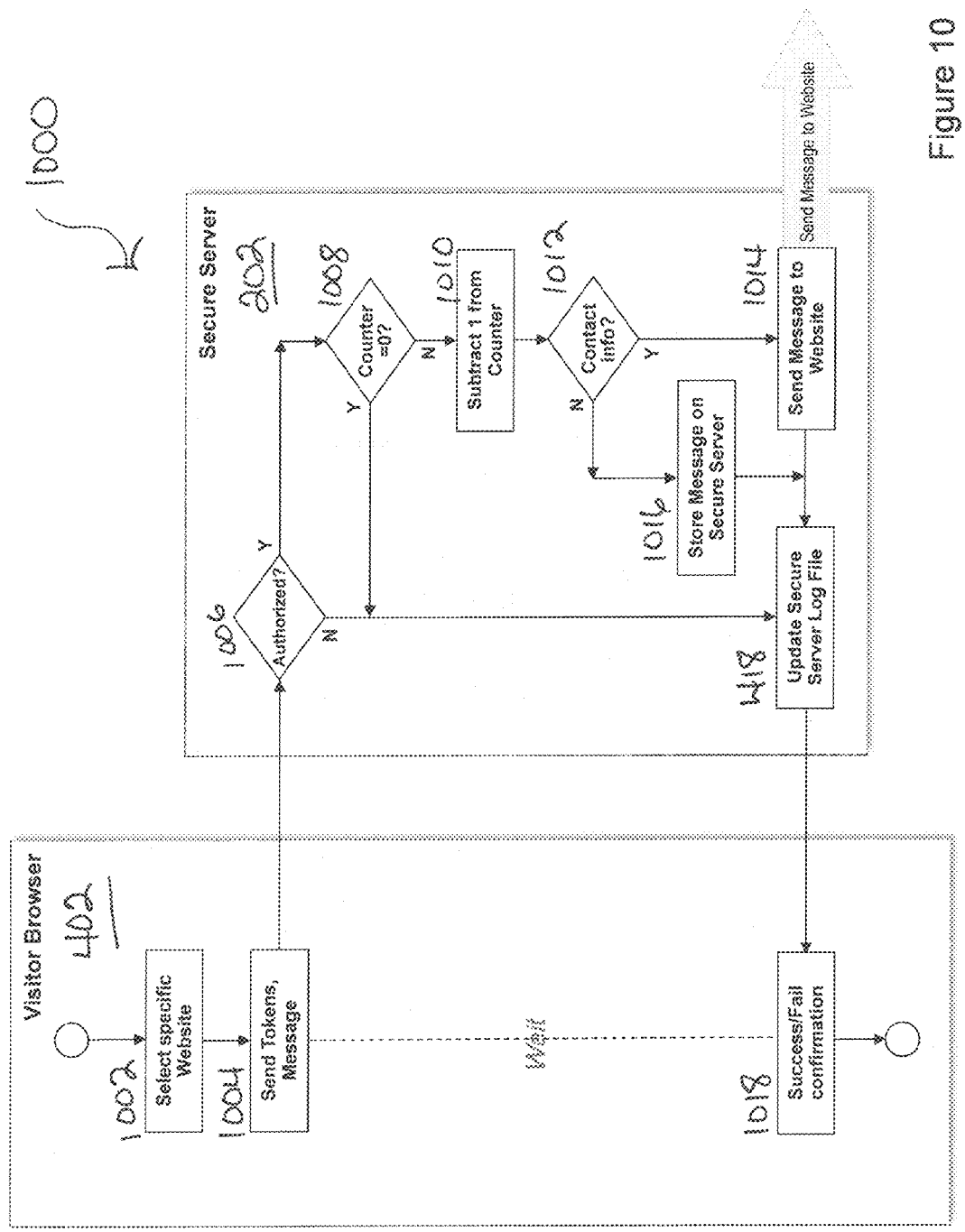
FIG. 10 is a flowchart that illustrates a Visitor establishing a Dialogue with a Website in accordance with one embodiment of the present invention.

In one embodiment and referring now to FIG. 10, a Visitor may prefer the control of using the present invention to establish a Dialogue with a Website. He or she uses a Browser 402 to Contact the Website 404 by visiting the Secure Server 202:

A list of the Websites visited by the Visitor is displayed:

If the desired Website is not shown, it is added to the list by the Visitor simply visiting that Website and then re-displaying this list.

Alternatively, the Visitor can give the Secure Server 202 the URL of the desired Website so that it is added to the list.

The Visitor selects the specific Website in block 1002 and enters the Message that is sent to the Secure Server 202 in block 1004. The Secure Server 202 performs the following:

If the Visitor or Website are not Authorized to use the present invention, as determined in decision block 1006, the Authorization Fails.

If the Visitor is not Authorized to use this Website Token, such as being Black Listed by the Website, as determined in decision block 1006, the Authorization Fails.

If the Visitor-to-Website Counter for this Visitor/Website combination is zero, as determined in decision block 1008, the Authorization Fails. Otherwise:

The Visitor-to-Website Counter for this Visitor/Website combination is decreased by one in block 1010.

If the Secure Server 202 has Contact information for this Website, as determined in decision block 1012, the Message is sent to the Website in the preferred manner in block 1014, such as by an instant message, email, text message, or XML. Note that the Website's Contact information is not given to the Visitor.

Otherwise the Message is stored on the Secure Sever 202 in block 1016 to be later accessed by the Website Administrator or Representative's Browser.

The Secure Server Log File is updated in block 418.

The Visitor's Browser 402 receives Message confirmation from the Secure Server 202 in block 1018. Optionally, confirmation is sent to Visitor in the preferred manner, such as an instant message, email, text message, Facebook®, or Twitter®.

If the Website later replies to the Message, the Website's Visitor-to-Website Counter for this Visitor is reset to the number of consecutive unanswered Messages permitted by this Visitor to this Website.

Visitor Maintenance on the Secure Server

Figure 11:
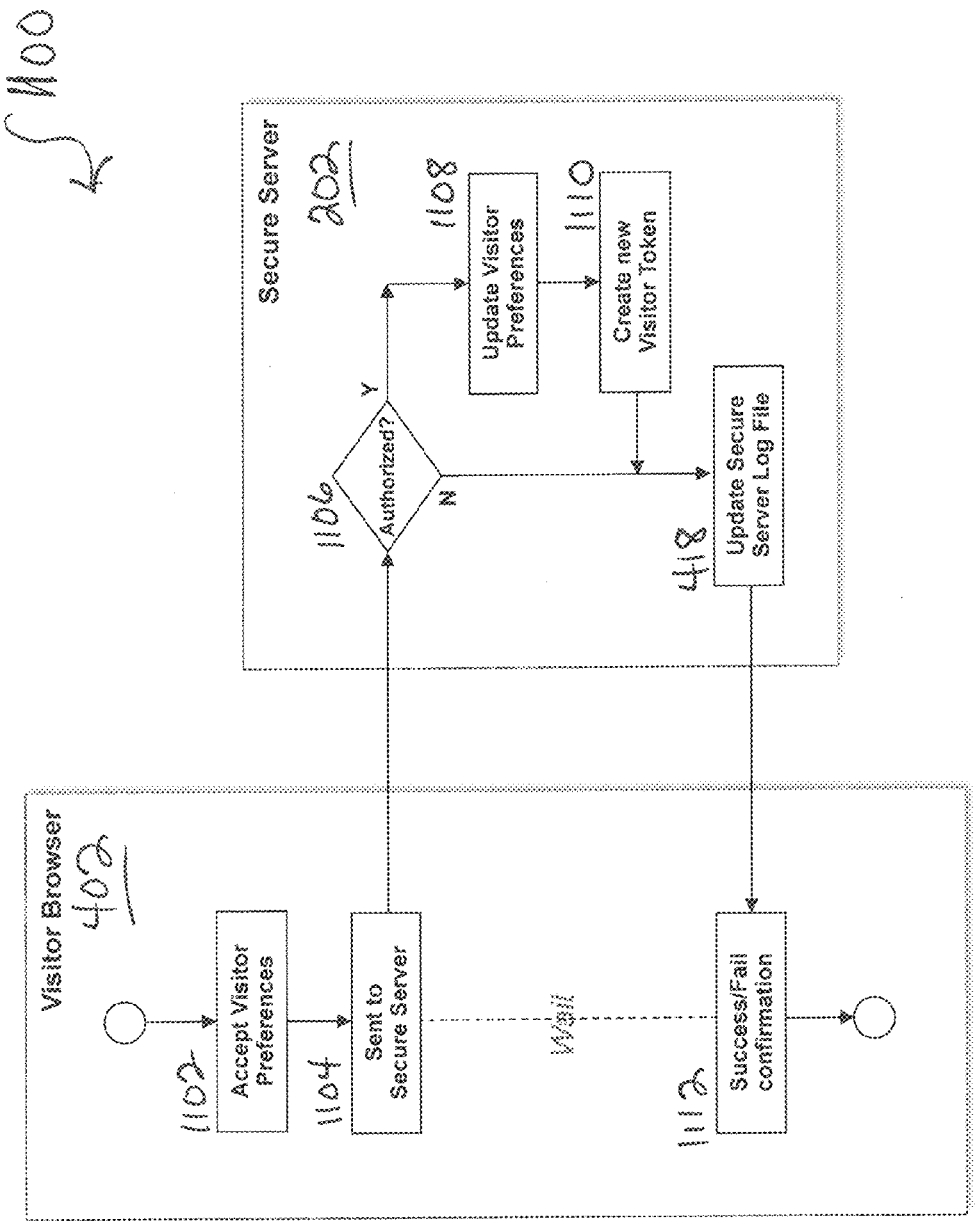
FIG. 11 is a flowchart that illustrates a Visitor updating Preferences in accordance with one embodiment of the present invention.

In one embodiment and referring now to flowchart 1100 in FIG. 11, an Authorized Visitor uses a Browser 402 to review and/or change the following Visitor information/preferences on the Secure Server 202:

Password, language, location, and Ad Preferences.

Requested Categories of interest from a Taxonomy. A Taxonomy, in one embodiment, is a collection of categories of products, services or individuals, and the questions and answers that define the features and options for each category. One embodiment is illustrated in FIG. 12.

Requested Category Attributes of interest from a Taxonomy. One embodiment is illustrated in FIG. 13.

Alternatively, or in addition, Requested Categories of interest and Requested Category Attributes of interest may be retrieved by other systems, as shown in FIG. 14 from U.S. Pat. No. 8,364,670 B2.

The Website-to-Visitor Counter for the maximum number of consecutive unanswered Messages permitted from any Website.

The acceptable Minimum Privacy Score for Websites.

The acceptable Minimum Website Rating for Websites.

Optional Payment Preferences and Contact Preferences.

The audit trail of this Visitor's activity on the Secure Server Log File.

For individual Websites:
  If disclosing AUD is not permitted (Black List).
  If sending AUD is permitted even if the calculated Website Privacy Score is below the Minimum Privacy Score required by this Visitor, or the Website's Rating is below the Minimum Website Rating required by this Visitor (White List).
  Website Ratings and comments of how the Website treated other Visitors. Website Ratings are collected by the Secure Server to warn other Visitors about Privacy violations, poor service, etc.
  The audit trail of Website activity on the Secure Server Log File.

The Authorized Visitor uses the Browser 402 to review and/or change the Visitor information/preferences on the Secure Server 202 as follows:
  The Visitor accepts the Visitor information/preferences or changes thereto in block 1102, which are then sent to the Secure Server 202 in block 1104. The Secure Server 202 performs the following:
    If the Visitor is not Authorized to use the present invention, as determined in decision block 1106, the Authorization Fails. Otherwise:
      The Visitor information/preferences are updated in block 1108.
      The Secure Server 202 creates a new Visitor Token in block 1110.
    The Secure Server Log File is updated in block 418.
    The Visitor's Browser 402 receives update confirmation (success/fail) from the Secure Server 202 in block 1112. Optionally, confirmation is sent to Visitor in the preferred manner, such as an instant message, email, text message, Facebook®, or Twitter®.

Website Maintenance on the Secure Server

Figure 15:
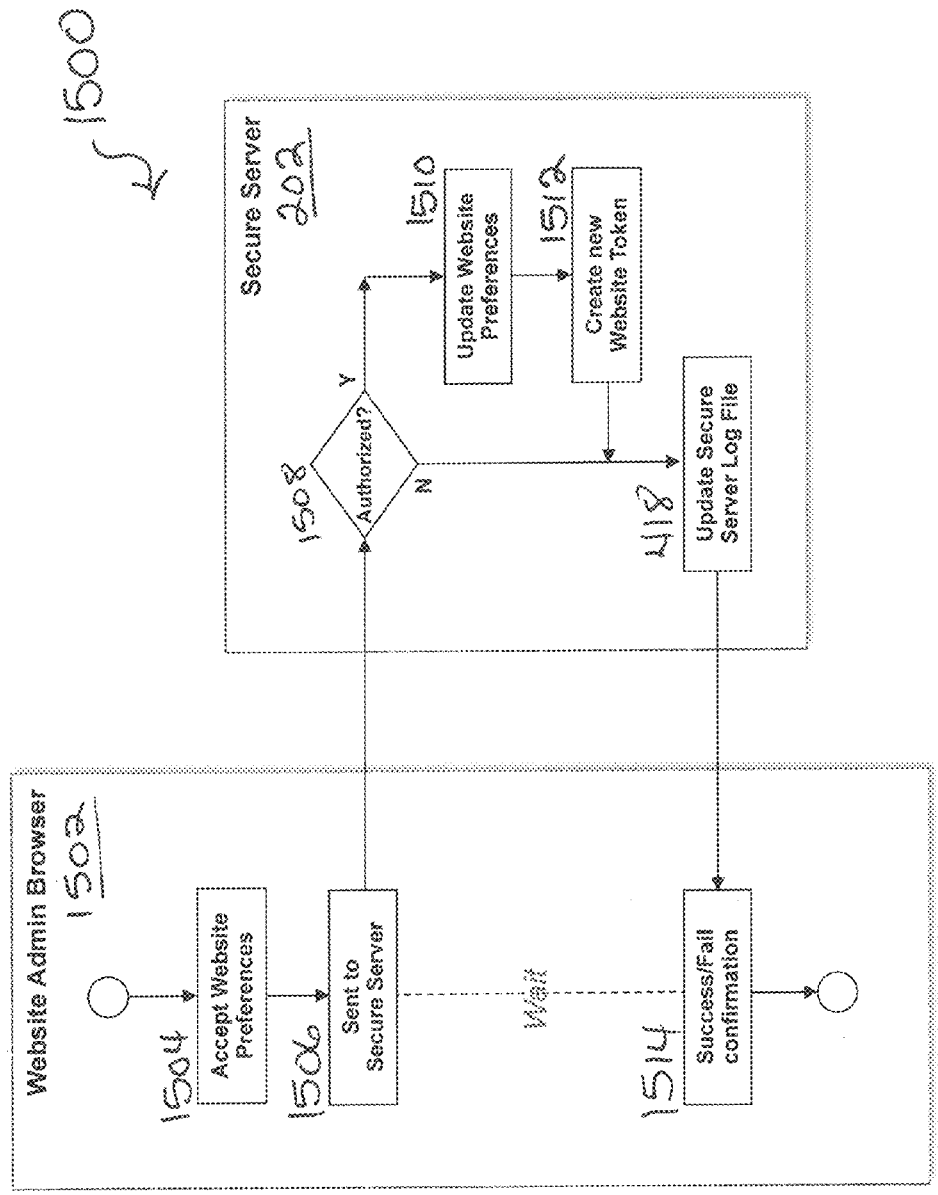
FIG. 15 is a flowchart that illustrates a Website updating Preferences in accordance with one embodiment of the present invention.

In one embodiment and referring now flowchart 1500 in FIG. 15, an Authorized Website Administrator or Representative uses a Browser 1502 to review and/or change the following Website information/preferences on the Secure Server 202:
  Password, General Preferences.
  Payment Preferences.
  Optional Contact Preferences.
  The audit trail of this Website's activity on the Secure Server Log File.
  For an individual Visitors:
    If accessing AUD has been blocked (Black List).
    If accessing AUD is permitted even if the Visitor Rating is below the Minimum Visitor Rating (White List).
    Visitor Ratings and comments of how the Visitors treated the Website. Visitor Ratings are collected by the Secure Server to warn other Websites of Visitors who show abusive behavior, etc.
    The audit trail of Visitor activity on the Secure Server Log File.

The Authorized Website Administrator or Representative uses the Browser 1502 to review and/or change the Website information/preferences on the Secure Server 202 as follows:
  The Authorized Website Administrator or Representative accepts the Website information/preferences or changes thereto in block 1504, which are then sent to the Secure Server 202 in block 1506. The Secure Server 202 performs the following:
    If the Authorized Website Administrator or Representative is not Authorized to use the present invention, as determined in decision block 1508, the Authorization Fails. Otherwise:
      The Website information/preferences are updated in block 1510.
      The Secure Server 202 creates a new Website Token in block 1512.
    The Secure Server Log File is updated in block 418.
    The Authorized Website Administrator or Representative Browser 1502 receives update confirmation (success/fail) from the Secure Server 202 in block 1514. Optionally, confirmation is sent to Authorized Website Administrator or Representative in the preferred manner, such as an instant message, email, text message, Facebook®, or Twitter®.

Warning Visitors Before Websites are Visited

Figure 16:
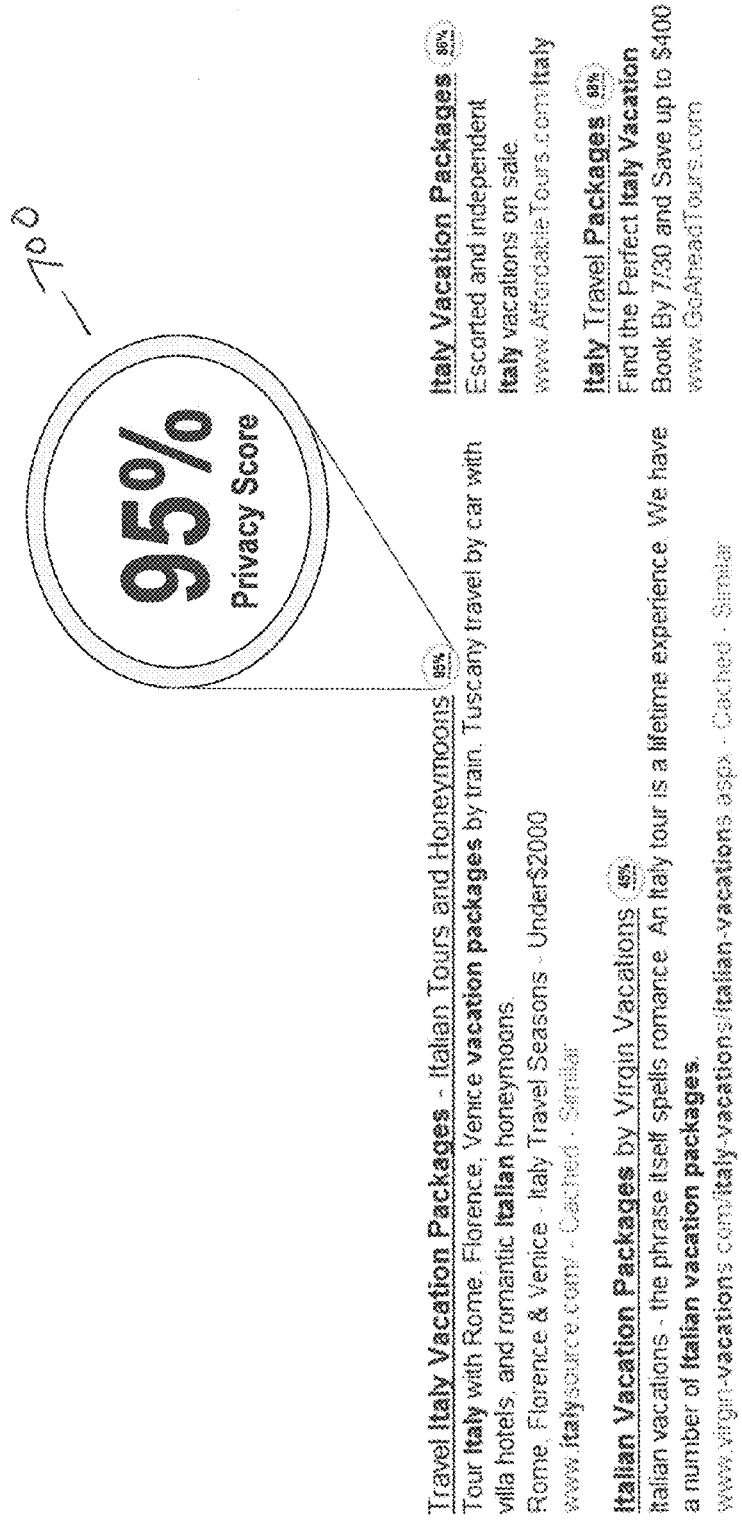
FIG. 16 is a screenshot of a Search Engine result in accordance with one embodiment of the present invention.

In another embodiment, the present invention further warns Visitors about Websites that do not respect their Privacy. As illustrated in FIG. 16, a Visitor Browser 402 plug-in retrieves a Website's Privacy Score from the Secure Server 202 and displays it in a Search Engine result as a Customized Seal (e.g., 700) so that Visitors are warned before that Website is selected. These Privacy Score requests are stored on the Secure Server Log File so that Websites can measure Search Engine click through rates. For example, the four websites could have Privacy Scores of 95%, 45%, 86% and 68% (these scores are for illustration purposes and do not represent actual scores for the websites shown). In one embodiment, the plug-in displays a red "?" Score for Websites that are not using the present invention and do not have a Website Privacy Score.

Figure 17:
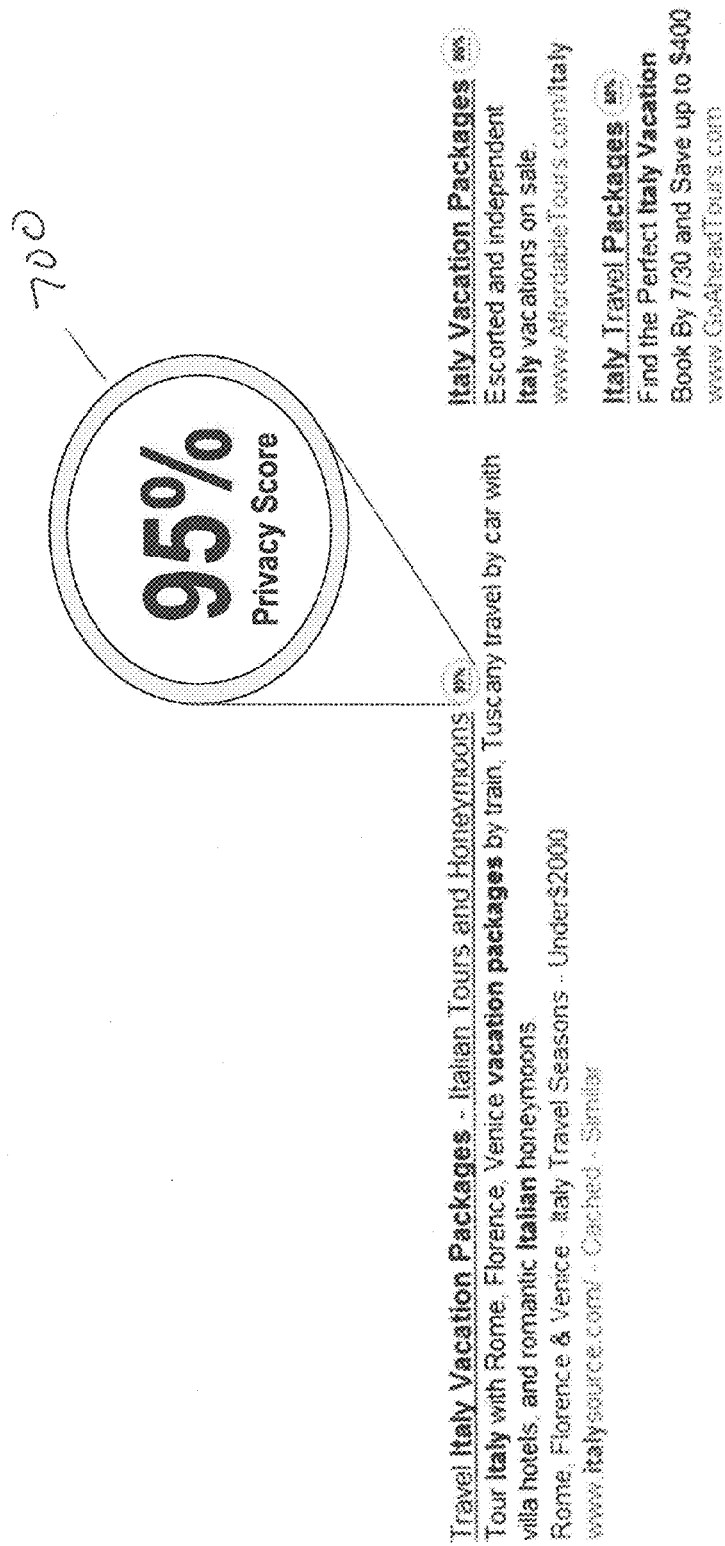
FIG. 17 is a screenshot of a Search Engine result in accordance with one embodiment of the present invention.

In another embodiment as illustrated in FIG. 17, the Visitor's plug-in filters out results when a Website's Privacy Score is below a Visitor's Minimum Privacy Score. In this example, the website having a Privacy Score of 45% was filtered; whereas, the websites having Privacy Scores of 95%, 86% and 68% were displayed (these scores are for illustration purposes and do not represent actual scores for the websites shown). The Websites that are both shown and filtered out are updated on the Secure Server Log File for later analysis.

Figure 18:
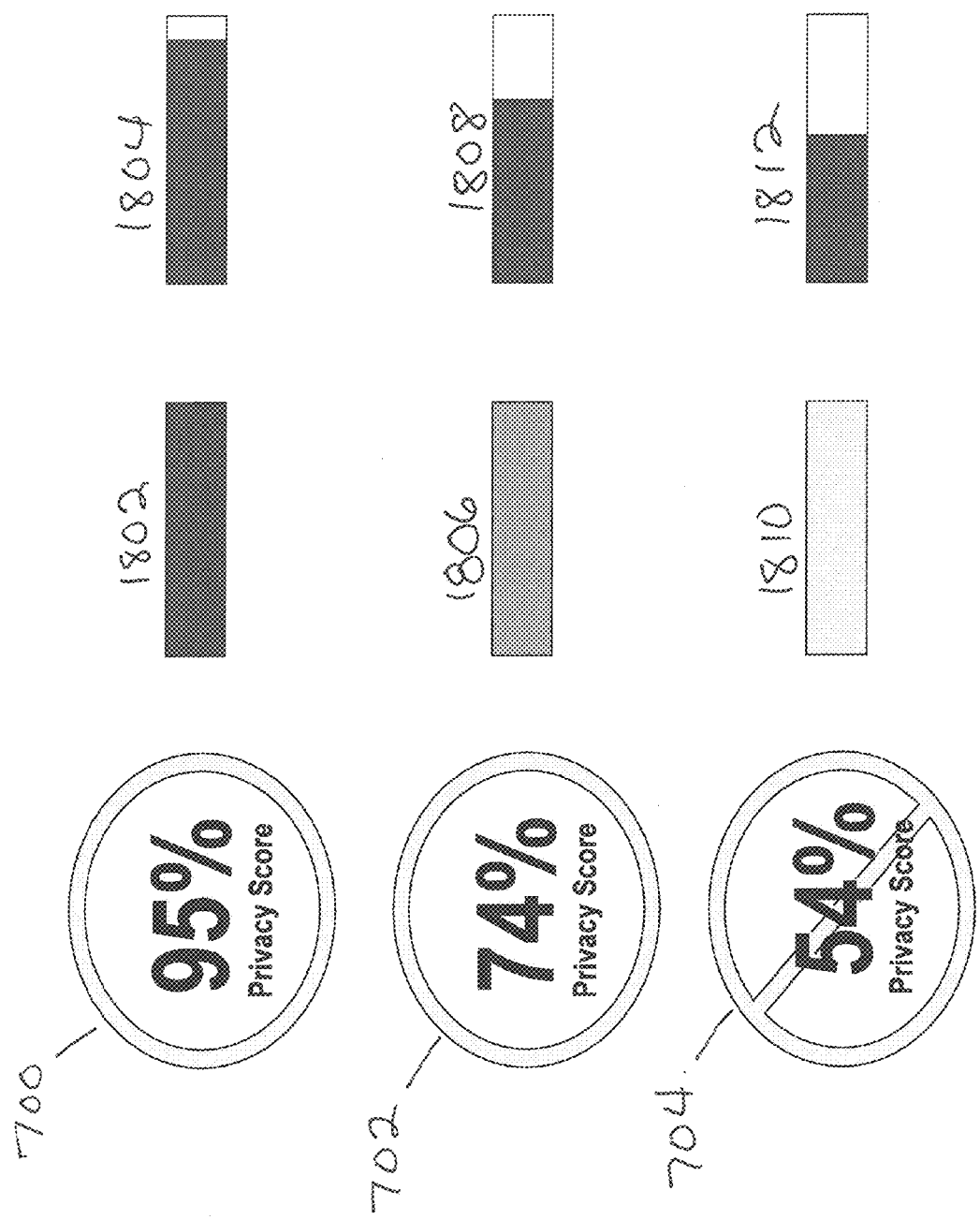
FIG. 18 is bar representations in accordance with one embodiment of the present invention.
Figure 19:
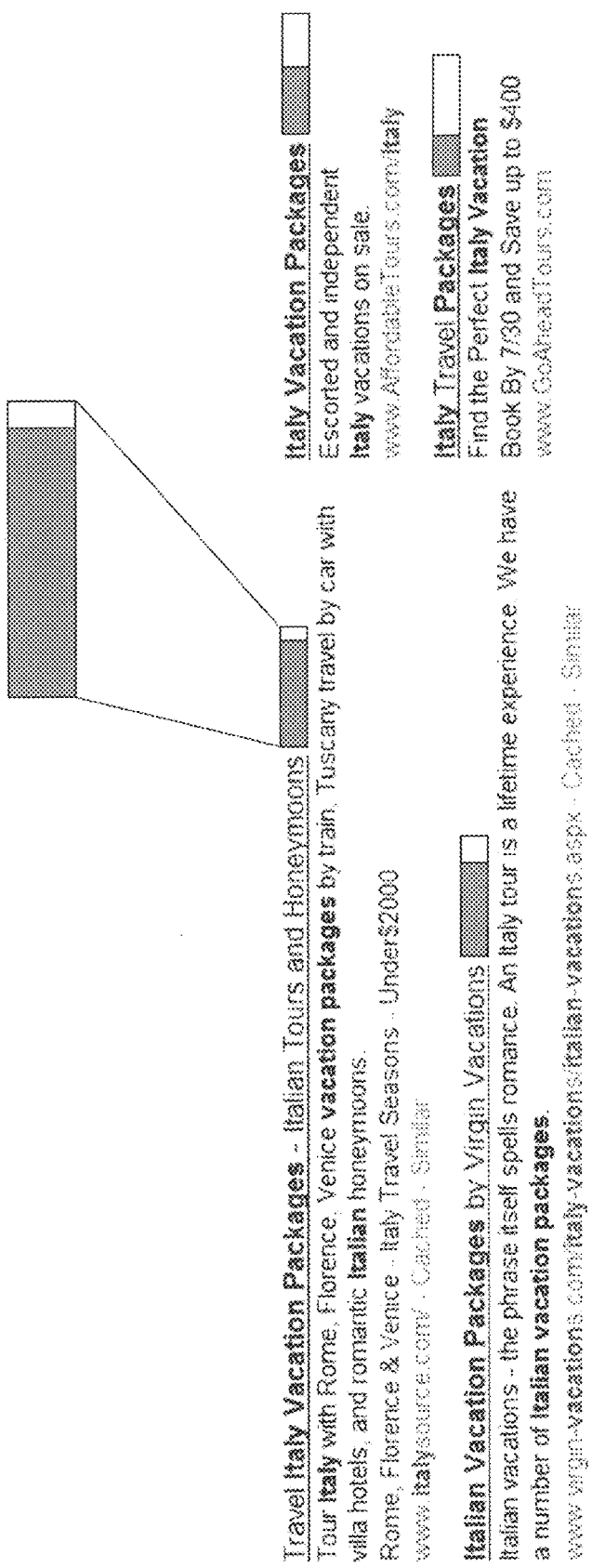
FIG. 19 is a screenshot of a Search Engine result in accordance with one embodiment of the present invention.

In yet another embodiment as illustrated in FIG. 18, bars may be used to visually indicate the Website's Privacy Score, either by the color of the bar and/or the length of the bar. For example: (1) a dark colored bar 1802 or bar having a colored in portion having a length of approximately 95% of the bar 1804 can represent a 95% Seal 700; (2) a medium colored bar 1806 or bar having a colored in portion having a length of approximately 74% of the bar 1808 can represent a 74% Seal 702; and (3) a light colored bar 1810 or bar having a colored in portion having a length of approximately 54% of the bar 1812 can represent a 54% Seal 704. Note that the color used in bars 1802 and 1804 could be green or shades thereof, the color used in bars 1806 and 1808 could be yellow or shades thereof, and the color used in bars 1810 and 1812 could be red or shades thereof. FIG. 19 illustrates the same information shown in FIG. 16, except the Customized Seals are replaced with bars consistent with the examples shown in FIG. 18.

Improving Search Engine Relevance

In addition to improving Website Relevance, the present invention also improves Search Engine Relevance. These companies spend billions trying guess what a person wants. In another embodiment, Visitor Requested Categories of interest and Requested Category Attributes of interest are used to replace this guesswork by passing Visitor UAD, Ads, and Keywords directly to Websites like Google®, Microsoft®, Facebook®, and Yahoo®.

Figure 20:
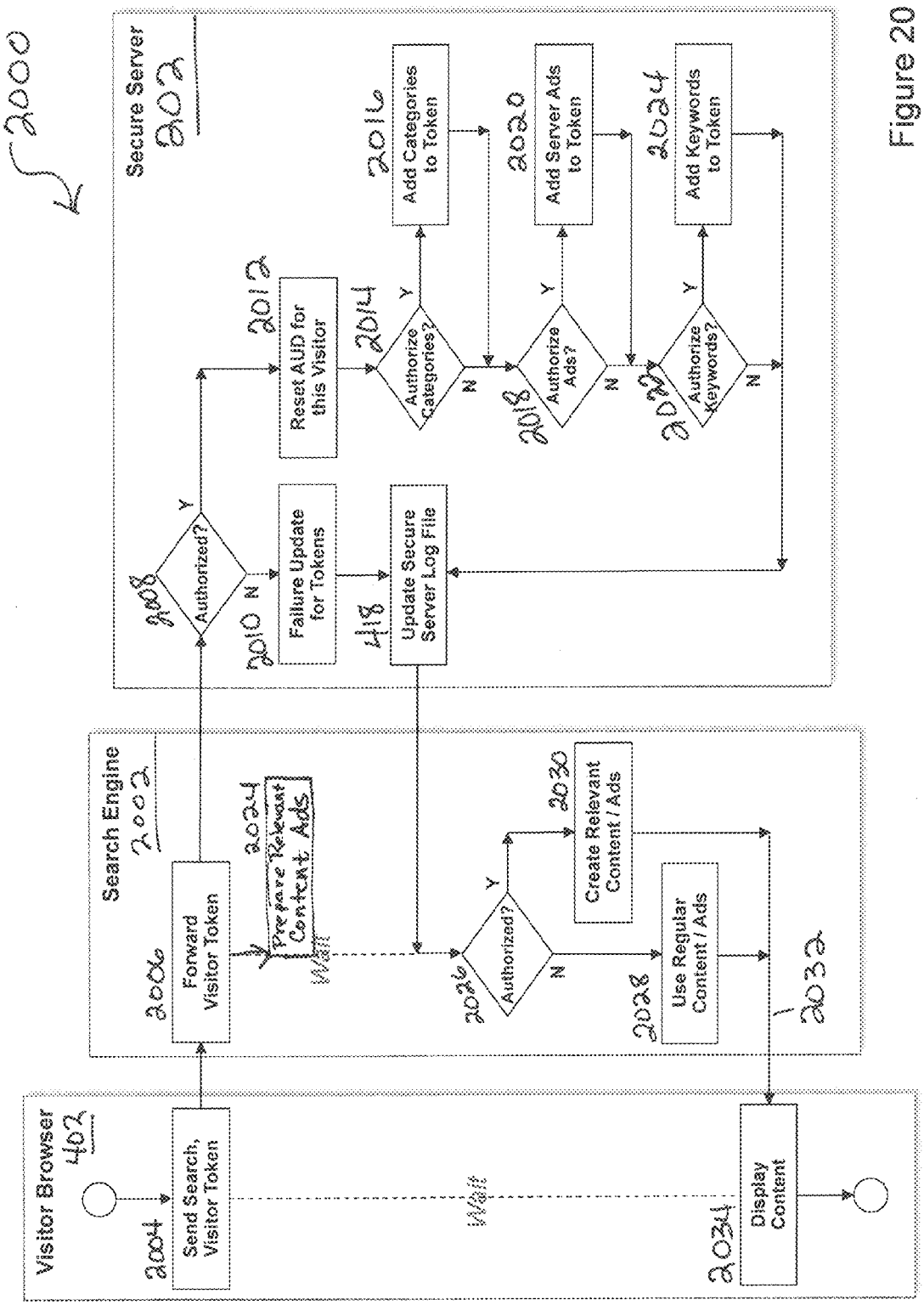
FIG. 20 is a flowchart that illustrates Search Engine processing in accordance with one embodiment of the present invention.

Referring to FIG. 20, a flowchart 2000 for improving search engine relevance is shown. The Visitor's Search Engine request is passed to the Search Engine 2002 along with the Visitor's Token in block 2004. This Token is forwarded along with the Search Engine's Token to Secure Server 202 in block 2006. The Secure Server 202 performs the following:

If the Search Engine 2002 is not Authorized by the Secure Server 202, as determined in decision block 2008, a Failure Update is stored in the Visitor Search Engine Tokens in block 2010. Other types and designs of Failure Seals or indicia can be used. Otherwise:

The AUD is reset in block 2012 to ensure that the needs of the Visitor are always current and up-to-the-moment.

Search Engine Authorization may be given for several reasons, including Visitor Preferences or Search Engines paying for a service:

If the Search Engine 2002 is Authorized to receive this Visitor's AUD of Requested Categories of interest and Requested Category Attributes of interest, as determined in decision block 2014, these are added to the Tokens in block 2016.

If the Search Engine 2002 is Authorized to receive the Secure Server Ads based on the Visitor's Ad Preferences, as determined in decision block 2018, they are added to the Tokens in block 2020.

If the Search Engine 2002 is Authorized to receive Keywords based on the Visitor's Ad Preferences, as determined in decision block 2022, they are added to the Tokens in block 2024.

In all cases, the Visitor and Search Engine 2002 transaction is updated on the Secure Server Log File in block 418.

During this time, the Search Engine 2002 prepares its Regular Content/Ads in block 2024.

With the return of the Tokens from the Secure Server 202, the Search Engine 2002 performs the following:

If not Authorized by the Secure Server 202, as determined in decision block 2026, the Search Engine 2002 uses its Regular Content/Ads in block 2028.

If Authorized by the Secure Server 202, as determined in decision block 2026, the Search Engine 2002 uses the Visitor's AUD, Ads, and Keywords to create Relevant Content/Ads to increase the Search Engine's Relevance for this Visitor while still respecting his or her Privacy in block 2030.

The Content/Ads are passed to the Visitor's Browser 402 (arrow 2032).

The Regular Content or Relevant Content/Ads with Seal are displayed on the Visitor Browser in block 2034.

In yet another embodiment, the Visitor's AUD, Ads, and Keywords are embedded in the Search Engine's results so that when the Visitor clicks on an "organic listing" or "sponsored link," this is automatically passed to the selected Website. In this way, the selected Website can mass-customize its Contents using a Visitor's AUD, Ads, and Keywords to make it Relevant. For example, if the Visitor is looking for waterfront property, the Search Engine filters out the search results that are not Relevant, and the selected Website displays only waterfront property for the Visitor. This is another new, unique, and novel way to increase Visitor Privacy, while at the same time, increase Website Relevance.

Enhancing the Present Invention

Those skilled in the art will create new ways for Visitor AUD, Ads, and Keywords to be shared with a Website and for a Visitor and Website to have a private Dialogue in a way that does not violate the Privacy of that Visitor while increasing the Relevance of that Website. These new ways will:

Permit a Visitor to:
  Disclose his or her AUD to Authorized Websites.
  Only see Relevant Content/Ads.
  Use Warnings and Seals to quickly assess the Privacy compliance of a Website.
  Have a trusted Dialogue.
  Save time.

Permit a Website to:
  Access AUD from an Authorized Visitor.
  Mass-customize Content/Ads to make them Relevant for each Visitor.
  Respect a Visitor's Privacy and time.
  Enable long-term, profitable relationships.
  Be protected from Visitors with low Visitor Ratings.
  Differentiate by being a consumer Privacy Champion.
  Increase the profitability of a Visitor relationship.
  Reactivate a lapsed Visitor relationship.

Revenue Models

In one embodiment, the present invention enables new and unique revenue models, including charging:
  A subscription fee.
  For the right to display a Seal rating the Privacy compliance of this Website.
  For personalizing the Content of the Website.
  For personalizing Ads from the Secure Server that are more Relevant than third party ads.
  For personalizing Keywords to make third party Ads more Relevant.
  For accepting and/or sending Messages.
  For marketing intelligence on how Websites are using AUD.
  For paying Visitors for time spent on a Website, for clicking on an Ad, etc.
  For access to Log Files.
  For protection from Visitors with low Visitor Ratings.
  For the level of compliance in a Website's Privacy Policy/Terms of Service. In one embodiment, a premium is charged to Websites with a low Website Privacy Score and/or low Website Rating.
  For making Websites more Relevant either when visited directly or based on the recommendation of a Search Engine that passes AUD to that Website.

For marketing intelligence from Search Engine click through rates

Summary

In summary, the present invention enables new and novel ways for a Visitor and a Website to interact, by improving prior art:

| From | To |
| --- | --- |
| Guessing | Knowing |
| Pushing Content | Pulling demand |
| Not private | Private |
| Seller centric | Buyer centric |
| General Content | Relevant, Customized Content |
| What we sell | What you want |
| Senders controlling relationships | Receivers controlling relationships |

As demonstrated and described above, the present invention can be provided in various embodiments, such as computerized methods, apparatuses, systems and/or non-transitory computer readable mediums.

The present invention provides a computerized method for increasing relevance of a content provided to a visitor by a content provider by providing one or more server computers and at least one data storage communicably coupled to the one or more server computers, receiving at least a portion of a visitor token and at least a portion of a content provider token at the one or more server computers from a content provider device, determining whether a release of an anonymous unfilled demand for the visitor is authorized based on the visitor token, the content provider token and one or more preferences stored in the at least one data storage, and sending at least a portion of the anonymous unfilled demand for the visitor to the content provider device when the release is authorized.

The content may include text, graphics, audio, video, hypertext links, music, video, applications, software, or a combination thereof. The content provider can be a search engine, a website, a service provider, an equipment provider, a device, an individual, an organization, a company, a governmental entity. The visitor device or the content provider device can be a computer, a laptop, a handheld computer, a personal data assistant, a telephone, a mobile telephone, a portable media player, a portable communications device, a facsimile device, or a Web-enabled device.

Additional steps include receiving one or more preferences from a visitor device or a content provider device, storing the one or more preferences in the data storage, creating a token for the visitor or the content provider, and sending the token to the visitor device or the content provider. Note that the token does not contain any personal information and may take the form of a cookie, a digital certificate, an electronic passport or other suitable vehicle. The one or more preferences may include one or more general preferences, one or more payment preferences, one or more contact preferences, or a combination thereof. Another step may include updating a log filed on the server computer or the data storage device.

The one or more general preferences for a content provider may include the content provider's own privacy policy and terms of service, a preferred language, a preferred location, one or more requested categories of interest served by the content provider, a maximum number of consecutive unanswered messages permitted from a visitor, a minimum visitor rating, etc. The one or more general preferences for a visitor may include a language preference, location preference, an advertisement preference, one or more requested categories of interest, one or more requested category attributes of interest, a maximum number of consecutive unanswered messages permitted from a content provider, a minimum privacy score, a minimum content provider rating, etc.

The one or more requested categories of interest and the one or more requested category attributes of interest can be selected using one or more drop down boxes, one or more check boxes, one or more radio buttons, one or more thumbnail pictures or videos, voice recognition, a fuzzy logic algorithm, or a neural network. Moreover, two or more of the requested categories of interest can be grouped into one or more subject areas. For example, the subject areas may include one of real estate, motor vehicles, employment, financial services, residential services, professional services, travel, vacation, computers, entertainment, dining, dating, hobbies, electronics, furniture, tools, home improvement, office supplies, household items, sporting goods, sporting events, recreation, or event tickets. The requested categories of interest within the real estate subject area may include houses, apartments, land, farms, commercial, insurance, finance or moving/storage. The requested categories of interest within the motor vehicles subject area may include cars, trucks, recreational, repairs, insurance or finance. The requested categories of interest within employment may include administrative, professional, education, healthcare, retail or manufacturing. The requested categories of interest within financial services may include mortgages, loans, brokerage accounts, mutual funds, small business or bill pay. The requested categories of interest within residential services may include plumber, electrician, lawn & garden, appliance repair, remodeling or cleaning. The requested categories of interest within professional service may include attorneys, accountants or computer services.

Thereafter, a regular content is prepared at the content provider device whenever the release was not authorized, the regular content is sent from the content provider device to the visitor device. A warning may be displayed on the visitor device whenever the release was not authorized. A relevant content based on the at least the portion of the anonymous unfilled demand for the visitor is created at the content provider device whenever the release was authorized, and the relevant content is sent from the content provider device to the visitor device. Note that a customized seal can be prepared for the content provider whenever the release is authorized, and the seal can be sent with the content from the content provider to the visitor device.

A privacy score for the content provider is determined and with the content from the content provider to the visitor device. The privacy score can be incorporated into the customized seal. The privacy score can also be displayed on a visitor device as a number, a graphic or both along with a content from the content provider. The privacy score is determined based on a content provider rating, how the content provider settles disputes, how the content provider uses visitor behavioral profiles, spyware, cookies, Web beacons, Web bugs, adware, spam, visitor personal information, or a combination thereof.

The present invention may also provide a messaging system between the visitor and the content provider.

In addition, the present invention provides an apparatus for increasing relevance of a content provided to a visitor by a content provider that includes one or more server computers, and at least one data storage communicably coupled to the one or more server computers. The one or more server computers (a) receive at least a portion of a visitor token and at least a portion of a content provider token at the one or more server computers from a content provider device, (b) determine whether a release of an anonymous unfilled demand for the visitor is authorized based on the visitor token, the content provider token and one or more preferences stored in the at least one data storage, and (c) send at least a portion of the anonymous unfilled demand for the visitor to the content provider device when the release is authorized.

The present invention also provides a system for increasing relevance of a content provided to a visitor by a content provider that includes a network, one or more visitor devices communicably coupled to the network, one or more content provider devices communicably coupled to the network, one or more server computers communicably coupled to the network and at least one data storage communicably coupled to the one or more server computers. The one or more server computers (a) receive at least a portion of a visitor token and at least a portion of a content provider token at the one or more server computers from a content provider device, (b) determine whether a release of an anonymous unfilled demand for the visitor is authorized based on the visitor token, the content provider token and one or more preferences stored in the at least one data storage, and (c) send at least a portion of the anonymous unfilled demand for the visitor to the content provider device when the release is authorized.

Moreover, the present invention provides a non-transitory computer readable medium for increasing relevance of a content provided to a visitor by a content provider comprising program instructions when executed by a processor causes the processor to perform the steps of receiving at least a portion of a visitor token and at least a portion of a content provider token at the processor from a content provider device; determining whether a release of an anonymous unfilled demand for the visitor is authorized based on the visitor token, the content provider token and one or more preferences stored in at least one data storage communicably coupled to the processor; and sending at least a portion of the anonymous unfilled demand for the visitor to the content provider device when the release is authorized.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A computerized method for increasing relevance of a content provided to a visitor by a content provider, the method comprising the steps of:

providing a server computer and at least one data storage communicably coupled to the server computer;

receiving at least a portion of a visitor token and at least a portion of a content provider token at the server computer from a content provider device, wherein the visitor token and the content provider token were previously created and sent by the server computer;

the server computer performs the following steps solely in response to receiving the visitor token and the content provider token from the content provider device without any request from the visitor:

determining whether a release of an anonymous unfilled demand for the visitor is authorized based on the visitor token, the content provider token and one or more preferences stored in the at least one data storage;

updating the visitor token and the content provider token to include one or more reason codes when the release is not authorized;

updating the visitor token and the content provider token to include at least a portion of the anonymous unfilled demand for the visitor when the release is authorized, wherein the portion of the anonymous unfilled demand for the visitor does not reveal an identity of the visitor; and sending the updated visitor token and the updated content provider token to the content provider device.

2. The method as recited in claim 1, further comprising the steps of:

receiving one or more preferences from a visitor device or a content provider device;

storing the one or more preferences in the data storage;

creating a token for the visitor or the content provider; and sending the token to the visitor device or the content provider.

3. The method as recited in claim 2, wherein the token does not contain any personal information.

4. The method as recited in claim 2, wherein the token comprises a cookie, a digital certificate or an electronic passport.

5. The method as recited in claim 2, wherein the one or more preferences comprise one or more general preferences, one or more payment preferences, one or more contact preferences, or a combination thereof.

6. The method as recited in claim 5, wherein the one or more general preferences for a content provider comprise the content provider's own privacy policy and terms of service, a preferred language, a preferred location, one or more requested categories of interest served by the content provider, a maximum number of consecutive unanswered messages permitted from a visitor, or a minimum visitor rating.

7. The method as recited in claim 5, wherein the one or more general preferences for a visitor comprise a language preference, location preference, an advertisement preference, one or more requested categories of interest, one or more requested category attributes of interest, a maximum number of consecutive unanswered messages permitted from a content provider, a minimum privacy score, or a minimum content provider rating.

8. The method as recited in claim 7, wherein the one or more requested categories of interest and the one or more requested category attributes of interest are selected using one or more drop down boxes, one or more check boxes, one or more radio buttons, one or more thumbnail pictures or videos, voice recognition, a fuzzy logic algorithm, or a neural network.

9. The method as recited in claim 7, wherein two or more of the requested categories of interest are grouped into one or more subject areas.

10. The method as recited in claim 9, wherein:
the subject areas comprise one of real estate, motor vehicles, employment, financial services, residential services, professional services, travel, vacation, computers, entertainment, dining, dating, hobbies, electronics, furniture, tools, home improvement, office supplies, household items, sporting goods, sporting events, recreation, or event tickets;
the requested categories of interest within the real estate subject area comprise houses, apartments, land, farms, commercial, insurance, finance or moving/storage;
the requested categories of interest within the motor vehicles subject area comprise cars, trucks, recreational, repairs, insurance or finance;
the requested categories of interest within employment comprise administrative, professional, education, healthcare, retail or manufacturing;
the requested categories of interest within financial services comprise mortgages, loans, brokerage accounts, mutual funds, small business or bill pay;
the requested categories of interest within residential services comprise plumber, electrician, lawn & garden, appliance repair, remodeling or cleaning; and
the requested categories of interest within professional service comprise attorneys, accountants or computer services.

11. The method as recited in claim 2, wherein the visitor device or the content provider device comprise a computer, a laptop, a handheld computer, a personal data assistant, a telephone, a mobile telephone, a portable media player, a portable communications device, a facsimile device, or a Web-enabled device.

12. The method as recited in claim 1, wherein:
the content comprises text, graphics, audio, video, hypertext links, music, video, applications, software, or a combination thereof; and
the content provider comprises a search engine, a website, a service provider, an equipment provider, a device, an individual, an organization, a company, a governmental entity.

13. The method as recited in claim 1, further comprising the step of updating a log filed on the server computer or the data storage device.

14. The method as recited in claim 1, further comprising the steps of:
creating a regular content at a content provider device whenever the release was not authorized; and
sending the regular content from the content provider device to a visitor device.

15. The method as recited in claim 14, further comprising the step of displaying a warning on the visitor device whenever the release was not authorized.

16. The method as recited in claim 1, further comprising the steps of:
creating a relevant content based on the at least the portion of the anonymous unfilled demand for the visitor at a content provider device whenever the release was authorized; and
sending the relevant content from the content provider device to a visitor device.

17. The method as recited in claim 1, further comprising the step of preparing a customized seal for the content provider whenever the release is authorized.

18. The method as recited in claim 17, further comprising the sending the customized seal with a content from the content provider to a visitor device.

19. The method as recited in claim 1, further comprising the step of determining a privacy score for the content provider and sending the privacy score with a content from the content provider to a visitor device.

20. The method as recited in claim 19, further comprising the step of incorporating the privacy score in a customized seal.

21. The method as recited in claim 19, wherein the privacy score is displayed on the visitor device as a number, a graphic or both along with a content from the content provider.

22. The method as recited in claim 19, wherein the privacy score is determined based on a content provider rating, how the content provider settles disputes, how the content provider uses visitor behavioral profiles, spyware, cookies, Web beacons, Web bugs, adware, spam, visitor personal information, or a combination thereof.

23. The method as recited in claim 1, further comprising the step of providing a messaging system between the visitor and the content provider.

24. An apparatus for increasing relevance of a content provided to a visitor by a content provider comprising:
a server computer;
at least one data storage communicably coupled to the server computer; and
the server computer (a) receive at least a portion of a visitor token and at least a portion of a content provider token at the server computer from a content provider device, wherein the visitor token and the content provider token were previously created and sent by the server computer, and the following steps are performed solely in response to receiving the visitor token and the content token from the content provider device without any request from the visitor: (b) determine whether a release of an anonymous unfilled demand for the visitor is authorized based on the visitor token, the content provider token and one or more preferences stored in the at least one data storage, (c) updating the visitor token and the content provider token to include one or more reason codes when the release is not authorized, (d) update the visitor token and the content provider token to include at least a portion of the anonymous unfilled demand for the visitor when the release is authorized, wherein the portion of the anonymous unfilled demand for the visitor does not reveal an identity of the visitor, and (e) send the updated visitor token and the updated content provider token to the content provider device.

25. A system for increasing relevance of a content provided to a visitor by a content provider comprising:
a network;
one or more visitor devices communicably coupled to the network;

one or more content provider devices communicably coupled to the network;
server computer communicably coupled to the network;
at least one data storage communicably coupled to the server computer; and
the server computer (a) receive at least a portion of a visitor token and at least a portion of a content provider token at the server computer from a content provider device, wherein the visitor token and the content provider token were previously created and sent by the server computer, and the following steps are performed solely in response to receiving the visitor token and the content token from the content provider device without any request from the visitor: (b) determine whether a release of an anonymous unfilled demand for the visitor is authorized based on the visitor token, the content provider token and one or more preferences stored in the at least one data storage, (c) updating the visitor token and the content provider token to include one or more reason codes when the release is not authorized, (d) update the visitor token and the content provider token to include at least a portion of the anonymous unfilled demand for the visitor when the release is authorized, wherein the portion of the anonymous unfilled demand for the visitor does not reveal an identity of the visitor, and (e) send the updated visitor token and the updated content provider token to the content provider device.

26. A non-transitory computer readable medium for increasing relevance of a content provided to a visitor by a content provider comprising program instructions when executed by a processor causes the processor to perform the steps of:
receiving at least a portion of a visitor token and at least a portion of a content provider token at the processor from a content provider device, wherein the visitor token and the content provider token were previously created and sent by the server computer;
determining whether a release of an anonymous unfilled demand for the visitor is authorized based on the visitor token, the content provider token and one or more preferences stored in at least one data storage communicably coupled to the processor;
the processor performs the following steps solely in response to receiving the visitor token and the content provider token from the content provider device without any request from the visitor:
updating the visitor token and the content provider token to include one or more reason codes when the release is not authorized;
updating the visitor token and the content provider token to include at least a portion of the anonymous unfilled demand for the visitor when the release is authorized, wherein the portion of the anonymous unfilled demand for the visitor does not reveal an identity of the visitor; and
sending the updated visitor token and the updated content provider token to the content provider device.

* * * * *